US012143479B2

(12) United States Patent
Franklin et al.

(10) Patent No.: US 12,143,479 B2
(45) Date of Patent: Nov. 12, 2024

(54) ULTRA HIGH ENTROPY MATERIAL-BASED NON-REVERSIBLE SPECTRAL SIGNATURE GENERATION VIA QUANTUM DOTS

(71) Applicant: Raytheon Company, Waltham, MA (US)

(72) Inventors: Stacey L. Franklin, Hawthorne, CA (US); Kalin Spariosu, Thousand Oaks, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 18/363,853

(22) Filed: Aug. 2, 2023

(65) Prior Publication Data

US 2023/0396424 A1 Dec. 7, 2023

Related U.S. Application Data

(62) Division of application No. 17/653,761, filed on Mar. 7, 2022, now Pat. No. 11,784,805.

(51) Int. Cl.
*H04L 9/08* (2006.01)
*G02F 2/02* (2006.01)
*H04L 9/32* (2006.01)

(52) U.S. Cl.
CPC ............. *H04L 9/0852* (2013.01); *G02F 2/02* (2013.01); *H04L 9/3236* (2013.01); *H04L 9/3278* (2013.01)

(58) Field of Classification Search
CPC ... H04L 9/0852; H04L 9/3236; H04L 9/3278; G02F 2/02

(Continued)

(56) References Cited

U.S. PATENT DOCUMENTS 6,501,091 B1 12/2002 Bawendi et al.
6,753,273 B2 6/2004 Holonyak, Jr. et al.
(Continued)

FOREIGN PATENT DOCUMENTS

CN 110784312 A 2/2020
EP 2 998 950 A1 3/2016
(Continued)

OTHER PUBLICATIONS

U.S. Appl. No. 17/653,761, filed Mar. 7, 2022, Franklin et al.
(Continued)

*Primary Examiner* — Dereena T Cattungal
(74) *Attorney, Agent, or Firm* — Schwegman Lundberg & Woessner, P.A.

(57) ABSTRACT

A physically unclonable function (PUF) device is provided, comprising an excitation source providing light for exciting quantum dots (QDs); a first layer of a material having contained therein a first random distribution of first QDs of a first type that are configured to generate a first color in response to being excited by the excitation source; a second layer of a second material having contained therein a second random distribution of second QDs of a second type that are configured to generate a second color, different from the first color, in response to being excited by the first excitation source, and a detector fixedly attached to one of the first and second layers and configured for detecting a pattern of light emitted by at least one of the first QDs and the second QDs and for providing an output indicative of the detected pattern.

20 Claims, 16 Drawing Sheets

(58) Field of Classification Search
USPC .......................................................... 380/255
See application file for complete search history.

(56) References Cited

U.S. PATENT DOCUMENTS

| | | | |
|---|---|---|---|
| 6,870,178 | B2 | 3/2005 | Asryan et al. |
| 7,326,908 | B2 | 2/2008 | Sargent et al. |
| 7,502,166 | B2 | 3/2009 | Stenton |
| 7,750,425 | B2 | 7/2010 | Forrest et al. |
| 7,821,675 | B2 | 10/2010 | Coyle et al. |
| 7,844,649 | B2 | 11/2010 | Fiorentino et al. |
| 7,916,065 | B1 | 3/2011 | Mintz et al. |
| 8,213,473 | B2 | 7/2012 | Spariosu et al. |
| 8,395,042 | B2 | 3/2013 | Dasgupta et al. |
| 8,411,711 | B2 | 4/2013 | Gubenko et al. |
| 8,742,398 | B2 * | 6/2014 | Klem .................... H10K 30/10 257/E31.058 |
| 9,199,842 | B2 | 12/2015 | Dubrow et al. |
| 9,382,432 | B1 | 7/2016 | McDaniel |
| 10,056,533 | B2 | 8/2018 | Kan et al. |
| 10,056,905 | B1 * | 8/2018 | Bowers ................. H04L 9/0866 |
| 10,553,684 | B2 | 2/2020 | Lee et al. |
| 10,679,223 | B2 | 6/2020 | Endress et al. |
| 10,711,188 | B2 | 7/2020 | Lin et al. |
| 10,768,485 | B2 | 9/2020 | Pickett et al. |
| 11,218,316 | B2 | 1/2022 | Wentz et al. |
| 2008/0112596 | A1 * | 5/2008 | Rhoads ................... G06T 1/005 382/115 |
| 2012/0132891 | A1 | 5/2012 | Pease, III et al. |
| 2012/0168506 | A1 * | 7/2012 | Ruehrmair ............. G06F 21/73 235/454 |
| 2015/0263203 | A1 * | 9/2015 | Lewis ................. H01L 31/0725 438/63 |
| 2020/0169424 | A1 * | 5/2020 | Young ..................... G09C 1/00 |
| 2020/0407627 | A1 | 12/2020 | Zhou et al. |
| 2021/0080393 | A1 | 3/2021 | Williams et al. |
| 2021/0192050 | A1 | 6/2021 | Hird et al. |
| 2022/0324243 | A1 * | 10/2022 | Zhu ........................ G06F 18/00 |

FOREIGN PATENT DOCUMENTS

| | | |
|---|---|---|
| EP | 2 371 044 B1 | 8/2019 |
| WO | WO 2013/025799 A2 | 2/2013 |

OTHER PUBLICATIONS

Carrillo-Nunez et al., "Simulation of Si Nanowire Quantum-dot Devices for Authentication;" Proceedings of the 2019 Joint International EUROSOI Workshop and International Conference on Ultimate Integration on Silicon (EUROSOI-ULIS); Apr. 1, 2019; 4 Pages.

Debnath et al., "Fingerprint Authentication Using QCA Technology;" Proceedings of 2017 Devices for Integrated Circuit (DevIC); Mar. 23, 2017; 6 Pages.

Ginet, "The Problem of IC Counterfeiting and its Solution;" Blogpost on Texplained; Oct. 2, 2017; 4 Pages.

Guin et al., "Anti-Counterfeit Techniques: From Design to Resign;" Proceedings of the 2013 14th International Workshop on Microprocessor Test and Verification; Dec. 11, 2013; 6 Pages.

McGrath et al., "A PUF Taxonomy;" Journal Article from *Applied Physics*, Rev. 6, 011303-1; Published Feb. 12, 2019; 25 Pages.

Rührmair et al., "Optical PUFs Reloaded;" Article from *Computer Science*; Published Jan. 2013; 13 Pages.

U.S. Notice of Allowance dated May 17, 2023 for U.S. Appl. No. 17/653,761; 15 Pages.

$1^{st}$ 312 Amendment filed on Jun. 6, 2023 for U.S. Appl. No. 17/653,761; 5 Pages.

$2^{nd}$ 312 Amendment filed on Jul. 18, 2023 for U.S. Appl. No. 17/653,761; 5 Pages.

\* cited by examiner

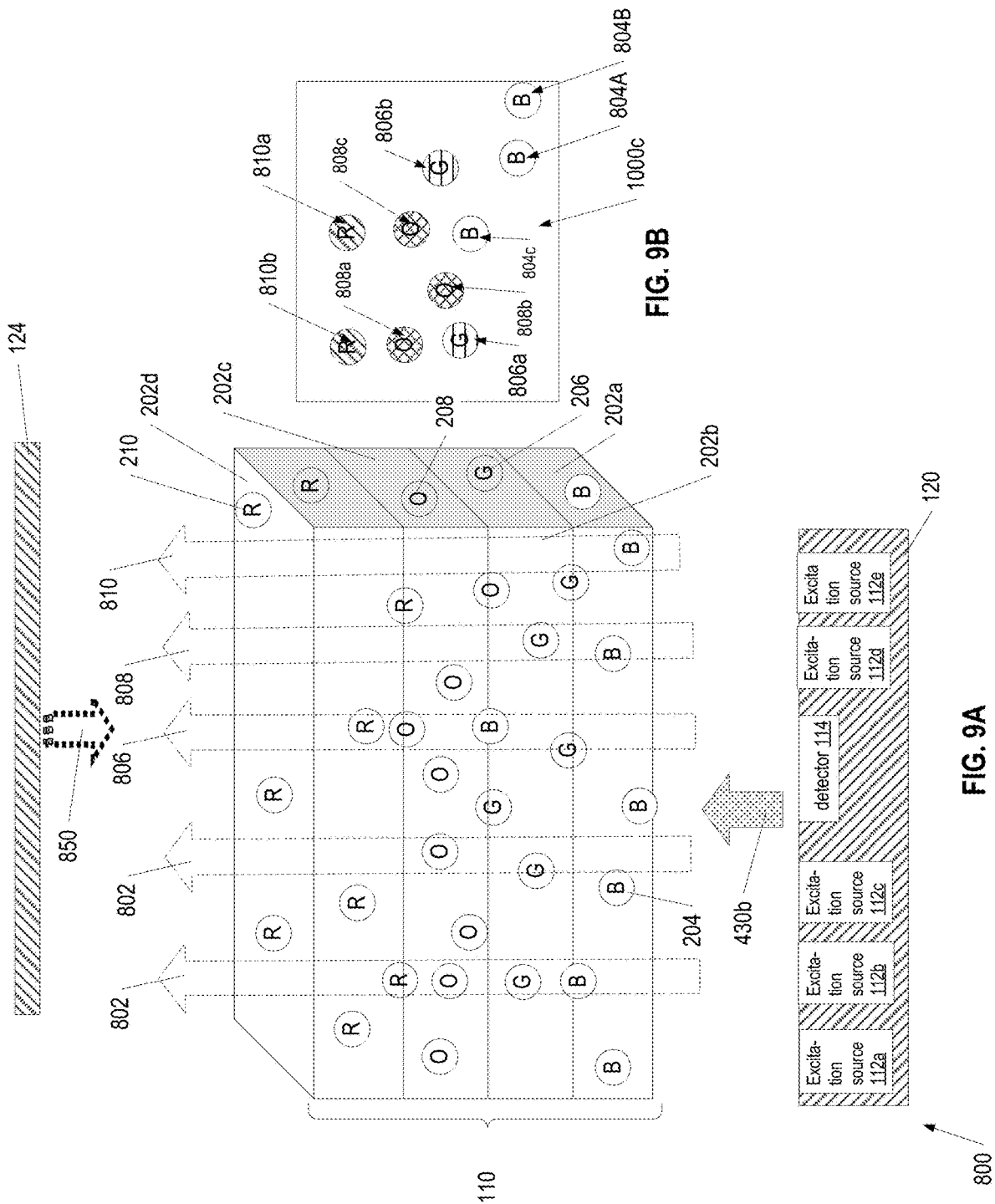

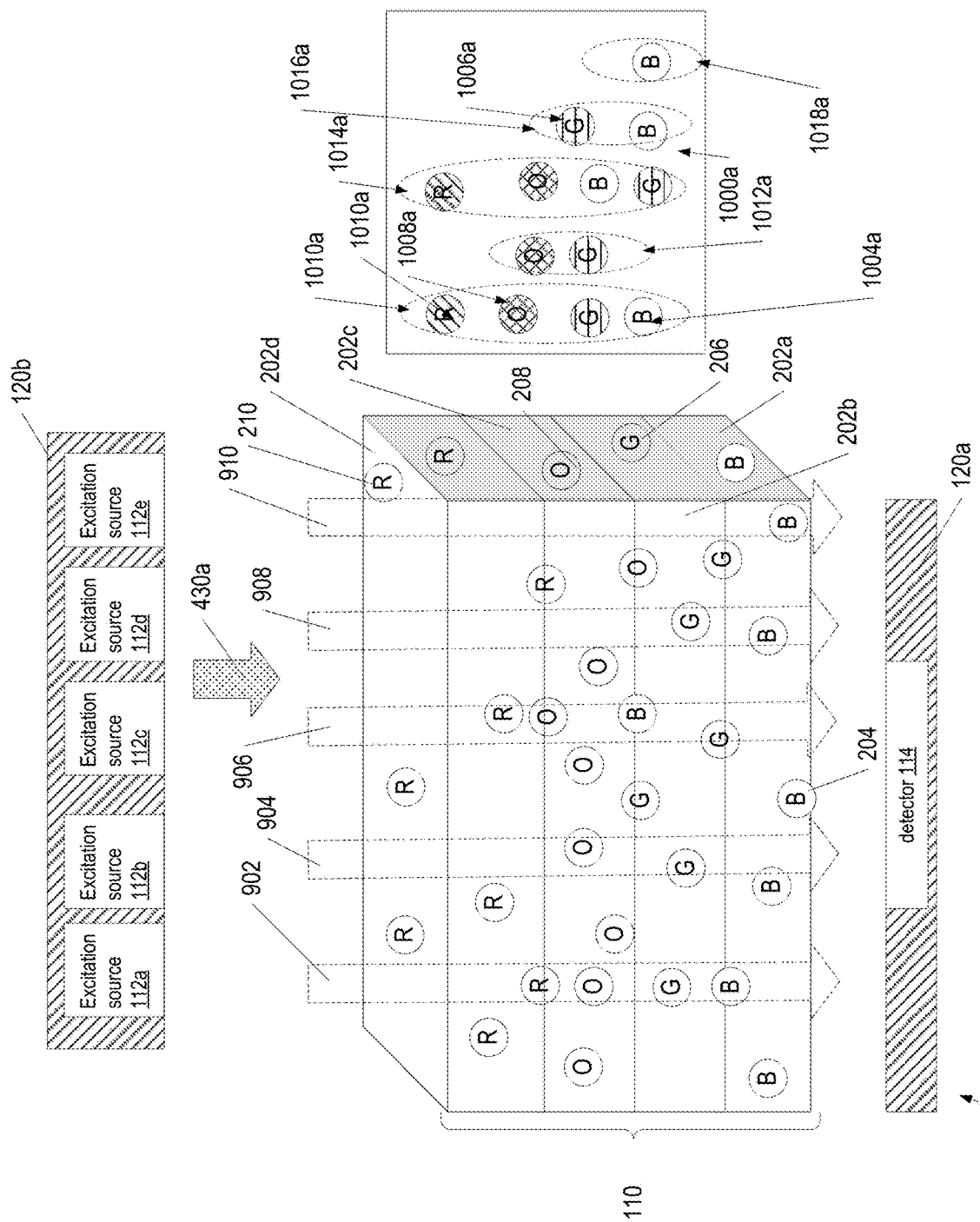

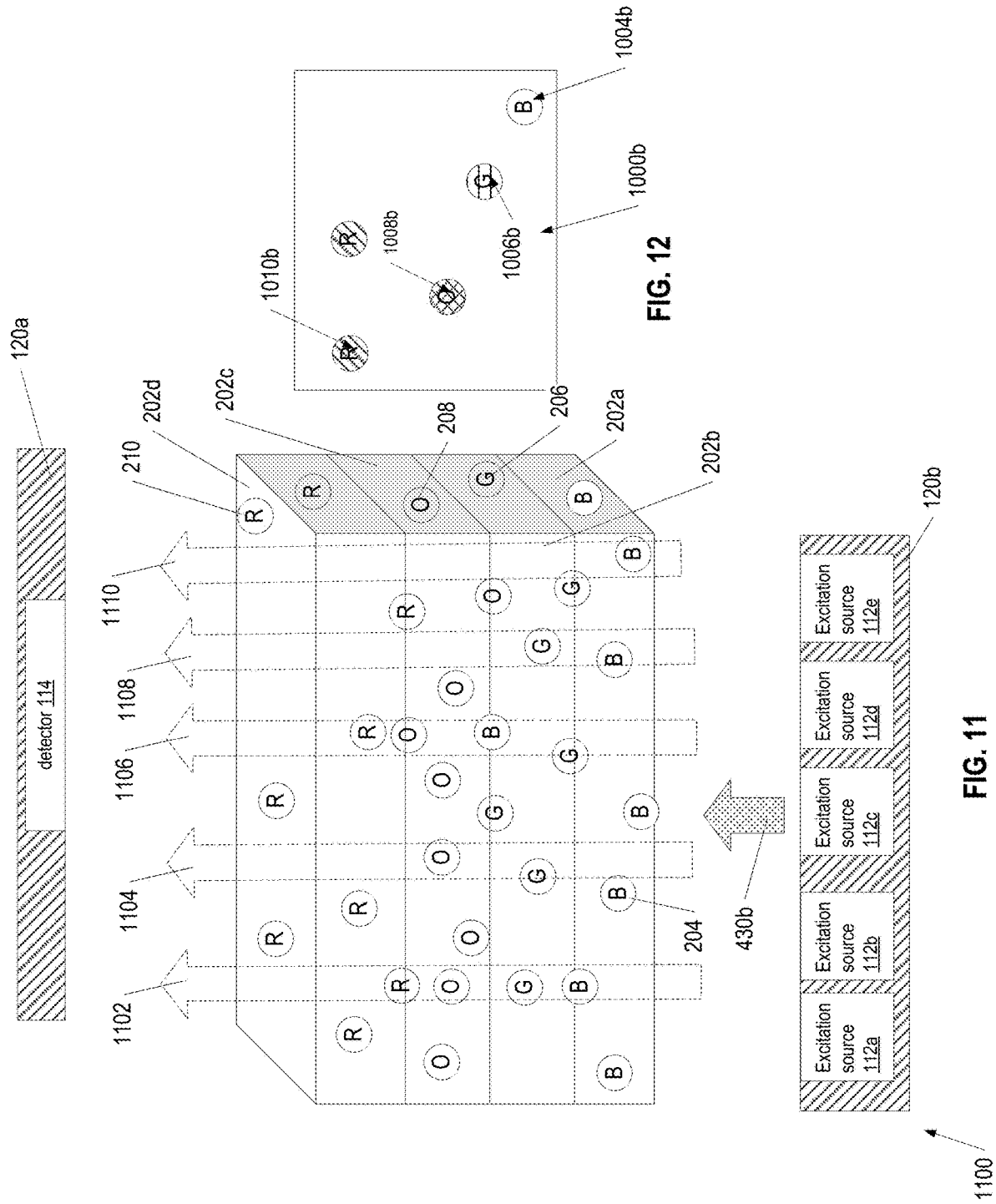

ULTRA HIGH ENTROPY MATERIAL-BASED NON-REVERSIBLE SPECTRAL SIGNATURE GENERATION VIA QUANTUM DOTS

CROSS REFERENCE TO RELATED APPLICATION

This application is a divisional application and claims the benefit of U.S. patent application Ser. No. 17/653,761, filed on Mar. 7, 2022 which is incorporated herein by reference in its entirety.

FIELD

Embodiments of the disclosure generally relate to devices, systems, and methods for self-authentication, especially using physically unclonable functions (PUFs). More particularly, the disclosure describes embodiments relating to devices, systems, and methods that apply and implement spectrally diverse embedded quantum dots to provide direction-specific unique spectral signatures usable as part of a PUF structure, to improve verification, authentication, and security of systems, methods, and devices.

BACKGROUND

Counterfeiting of devices and components such as integrated circuits (ICs) have been a significant challenge for the global supply chain. Counterfeit ICs can significantly impact performance, reliability, and security of circuits where such counterfeit ICs are installed. Moreover, if counterfeit components are used in critical applications (e.g., medical, aerospace, defense, vehicles, etc.), there may be catastrophic results, ranging from loss of life and/or property to shutdown of vital power, communications/and/financial infrastructure/networks, to release of state secrets to adversaries and corporate secrets to competitors. Existing solutions to attempt to detect and address the issue of counterfeit components have been less than effective and can require customized test equipment and other costly resources. Two primary ways to identify counterfeit components in the electronic component supply chain include detection tests (which use specific equipment, e.g., X rays, to detect counterfeit parts already in the supply chain) and avoidance measures (which add extra circuit hardware in the circuit to detect counterfeit parts without a need for performing a detection test).

Another area where imposters and fraudulent devices can be a concern is with authentication of one system or component to another system, such as to computer systems, especially computer networks and related technologies. For example, the so-called the Internet of Things (IoT), enables many billions of "things," including but not limited to machines, objects, devices, smart phones, computers, smart watches, automobiles, home appliances, personal electronic assistants, cameras, speakers, tracking devices, etc., to interconnect with each other, collect data and respond to the collected data, and/or to share the data. Because many of these devices need to connect automatically and without human intervention, it can be important that such devices are able to authenticate themselves, such as automatically or in response to a query or challenge. Availability of wireless network technology such as 5G and the like are helping to further expand the ability of networked devices and/or fully autonomous devices to be dynamic and mobile, enabling the provision of multiple new services and capabilities for many types of users in multiple industries, including medical, military, commercial, financial, industrial, and the like IoT devices, in particular, are driving much of the growth of computer networks and currently account for more than 30% of all network-connected enterprise endpoints. It is expected that there will be 41 billion IoT Devices by 2027.

Thus, there is an increased need for techniques to enable authentication of components, devices and systems, especially in an autonomous, semi-autonomous, and/or automatic manner, and preferably in a way that is difficult for bad actors to counterfeit or copy.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

An emerging challenge for many devices, systems, and articles of manufacture, is ensuring their security and authenticity. It would be advantageous, as well, if a security, identification, and authentication technique could provide a self-authentication feature that can address both the problem of device counterfeiting as well as authentication as part of the IoT and other applications where self-authentication is needed. Further, it can be especially important in some applications to provide self-authentication mechanisms, which cannot be observed, bypassed, or falsified. Computer networks have to deal with attempts at phishing, spoofing, attack, and other unwanted intrusions. While there are many techniques and advances that attempt to increase the security of authenticating users (e.g., two factor authentication, biometric authentication), increasing the security of the devices themselves, especially those that can operate autonomously, is equally important.

Establishing identity and/or authenticity of devices and systems is becoming increasingly important to ensure security yet also is becoming increasingly difficult, allowing rogue, imposter, and/or counterfeit devices (whether or not directly controlled by rogue actors) to take the place of legitimate ones. This issue is compounded even further when the rogue devices are installed into other assemblies that are used to contain and/or process, sensitive information (e.g., financial information, personal credentials, defense system information, medical information, etc.) making it possible to attack the device itself and/or compromise the information. Many hardware-based authentication arrangements can be vulnerable to falsification, especially if the authentication can be observed by others and then replicated into counterfeit or other non-authentic devices.

In addition, there can be a need for secure and automatic self-authentication of devices and/or systems where user input of a password or other authentication credential is inconvenient, difficult, and/or impossible, such as for ICs and other components, circuits to be installed into other assemblies, and devices and systems that are, for example, embedded in a vehicle, embedded in a deployed system, etc.

A system of one or more computers can be configured to perform particular operations or actions of the aspects described herein by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a physically unclonable function (PUF) device. The physically unclonable function also includes a first excitation source configured to be externally controllable to provide first light at a first frequency suitable for exciting quantum dots (QDs); a first layer of a first material having contained therein a first random distribution of first QDs of a first type, disposed at a first plurality of random locations, where the first type of QDs are configured to generate a first color in response to being excited by the first excitation source; a second layer of a second material having contained therein a second random distribution of second QDs of a second type, disposed at a second plurality of random locations, where the second type of QDs are configured to generate a second color in response to being excited by the first excitation source, where the second color is different from the first color; and a detector fixedly attached to one of the first and second layers, the detector configured for detecting a least a first pattern of light emitted by at least one of the first QDs and the second QDs when excited by the first excitation source, wherein the detector is configured for providing an output indicative of the detected at least a first pattern of light; and where the excitation source is fixedly attached to one of the first and second layers.

Implementations may include one or more of the following features. In some embodiments, the detected first pattern of light has a first appearance if the detector is fixedly attached to the first layer and a second appearance if the detector is fixedly attached to the second layer, where the first and second appearance are different. In some embodiments, the detected first pattern of light is unique to the PUF. In some embodiments, there is a boundary between the first layer and the second layer and where there is an overlap of the first plurality of random locations and the second plurality of random locations, along the boundary.

In some embodiments, at least one of the first and second materials may include a material that is configured to allow transmitted light to reach at least a portion of the respective QDs contained within that respective at least one of the first and second materials. In some embodiments, the detector and the first excitation source are both fixedly coupled to the same one of the first and second layers. In some embodiments, the detector is fixedly coupled to a different one of the first and second layers than the first excitation source. In some embodiments, the PUF device may include a second excitation source configured to be externally controllable to provide second light at a second frequency suitable for exciting QDs. In some embodiments, the first frequency corresponds to short-wavelength light.

In some embodiments, the PUF device further comprises a third layer of a third material having contained therein a third random distribution of third QDs of a third type, disposed at a third plurality of random locations, wherein the third type of QDs are configured to generate a third color in response to being excited by the first excitation source, wherein the third color is different than both the first color and the second color. In some embodiments, the first, second, and third layers are constructed and arranged so that the second layer is disposed in between the first and third layers, and where the first type of QD is associated with a shorter wavelength of light than both the second type of QD and the third type of QD. In some embodiments, the first, second, and third layers are constructed and arranged so that the second layer is disposed in between the first and third layers, and where the third type of QD is associated with a longer wavelength than both the first type of QD and the second type of QD.

In some embodiments, the first pattern of light may include the first, second, and third colors. In some embodiments, the first pattern of light may include both the first color and the second color. In some embodiments, the first excitation source, first layer, second layer, and detector are constructed and arranged so that the first light and first pattern of light are externally unrevealed. In some embodiments, the detector is configured to determine a hash of the first pattern of light and to communicate the hash of the first pattern of light to an external system that is configured to determine if the hash of the first pattern of light matches a stored hash associated with the PUF device.

One general aspect includes a method of making a physically unclonable function (PUF) device. The method also includes providing a first layer of a first optically clear medium; infusing a first random distribution of first quantum dots (QDs) of a first type, disposed at a first plurality of random locations, into the first layer where the first type of QDs are configured to generate a first color in response to being excited by an excitation source; partially curing the first layer such that at least a first portion of the first QDs are fixed into at least a first portion of the first plurality of random positions and such that at least a second portion of the first QDs are not in a fixed position; applying a second layer of a second optically clear medium, over the first layer, after partial curing; infusing a second random distribution of second quantum dots (QDs) of a second type, disposed at a second plurality of random locations, into the second layer, where the second type of QDs are configured to generate a second color in response to being excited by the excitation source, where the second color is different than the first color, where the infusion of the second random distribution of second QDs is configured so that at least a third portion of the second random distribution of second QDs are intermingled with the second portion of the first QDs; curing the second layer to a degree sufficient to ensure that both the first QDs and second QDs are substantially fixed into position; operably coupling a detector and an excitation source to the layered structure so that the excitation source is configured to direct light to the first and second layers and so that the detector is configured to detect a pattern of light that arises from directing light at first and second QDs; and where the excitation source, first layer, second layer, and detector are constructed and arranged so that the light and the pattern of light are externally unrevealed.

Implementations may include one or more of the following features. In some embodiments of the method, the layered structure, detector and excitation source are constructed and arranged so that the pattern of light has a first appearance if the detector is fixedly attached to the first layer and a second appearance if the detector is fixedly attached to the second layer, where the first and second appearance are different.

One general aspect includes a method of verifying an article of manufacture coupling to an article of manufacture a physically unclonable function (PUF) device that may include: a built-in excitation source configured to be externally controllable to provide light at a first frequency suitable for exciting quantum dots (QDs); a first layer of a first material having contained therein a first random distribution of first quantum dots (QDs) of a first type, disposed at a first plurality of random locations, where the first type of QDs are configured to generate a first color in response to being excited by light from the built-in excitation source; a second layer of a second material having contained therein a second random distribution of second QDs of a second type, disposed at a second plurality of random locations, where the second type of QDs are configured to generate a second color in response to being excited by light from the built-in excitation source, where the second color is different from the first color; and a built-in detector fixedly attached to one of the first and second layers, the detector configured for detecting a pattern of light emitted by at least one of the first QDs and the second QDs in response to the excitation source providing light, where the detector is configured for providing an output indicative of the detected pattern of light; where the PUF device is configured to convert the detected pattern of light into a second digital fingerprint; causing the built-in excitation source providing light to excite at least a portion of the first random distribution of first QDs and at least a portion of the second random distribution of second QDs; receiving from the PUF device, in response to the built-in excitation source providing light, a spectral signature; and verifying the article of manufacture if the spectral signature satisfies a predetermined condition. In some embodiments, the PUF device is configured so that the light and the pattern of light are externally unrevealed.

Other embodiments of this aspect include corresponding computer systems, apparatus, and computer programs recorded on one or more computer storage devices, each configured to perform the actions of the methods.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which:

FIG. 9A is a first perspective exploded view of an embodiment of the PUF of FIG. 2, with a detector on the bottom and excitation sources on the bottom, and internal reflector on top, showing excitation from a first direction and co-propagating directions of emissions from QDs, in accordance with one embodiment;

FIG. 9B is a portion of a first exemplary spectral readout from the arrangement of FIG. 9A, as viewed from a detector at "bottom" of the structure, showing a first exemplary spectral pattern associated with the co-propagating light pattern of FIG. 9A;

FIG. 10A is a second perspective exploded view of an embodiment of the PUF of FIG. 2, with a detector on the bottom and excitation sources on the top, showing excitation from a first direction and co-propagating directions of emissions from QDs, in accordance with one embodiment;

FIG. 10B is a portion of an exemplary second spectral readout from the arrangement of FIG. 10A, as viewed from a detector at "bottom" of the structure (detector on bottom), showing spectral pattern associated with the co-propagating light pattern of FIG. 10A;

FIG. 11 is a third perspective exploded view an embodiment of the PUF of FIG. 2, with a detector on the top and excitation sources on the bottom, showing excitation from a first direction and co-propagating directions of emissions from QDs, in accordance with one embodiment;

FIG. 12 is a third exemplary spectral readout from the arrangement of FIG. 11, as viewed from a detector at the "top" of the structure (detector on top);

The drawings are not to scale, emphasis instead being on illustrating the principles and features of the disclosed embodiments. In addition, in the drawings, like reference numbers indicate like elements.

DETAILED DESCRIPTION

Figure 1:
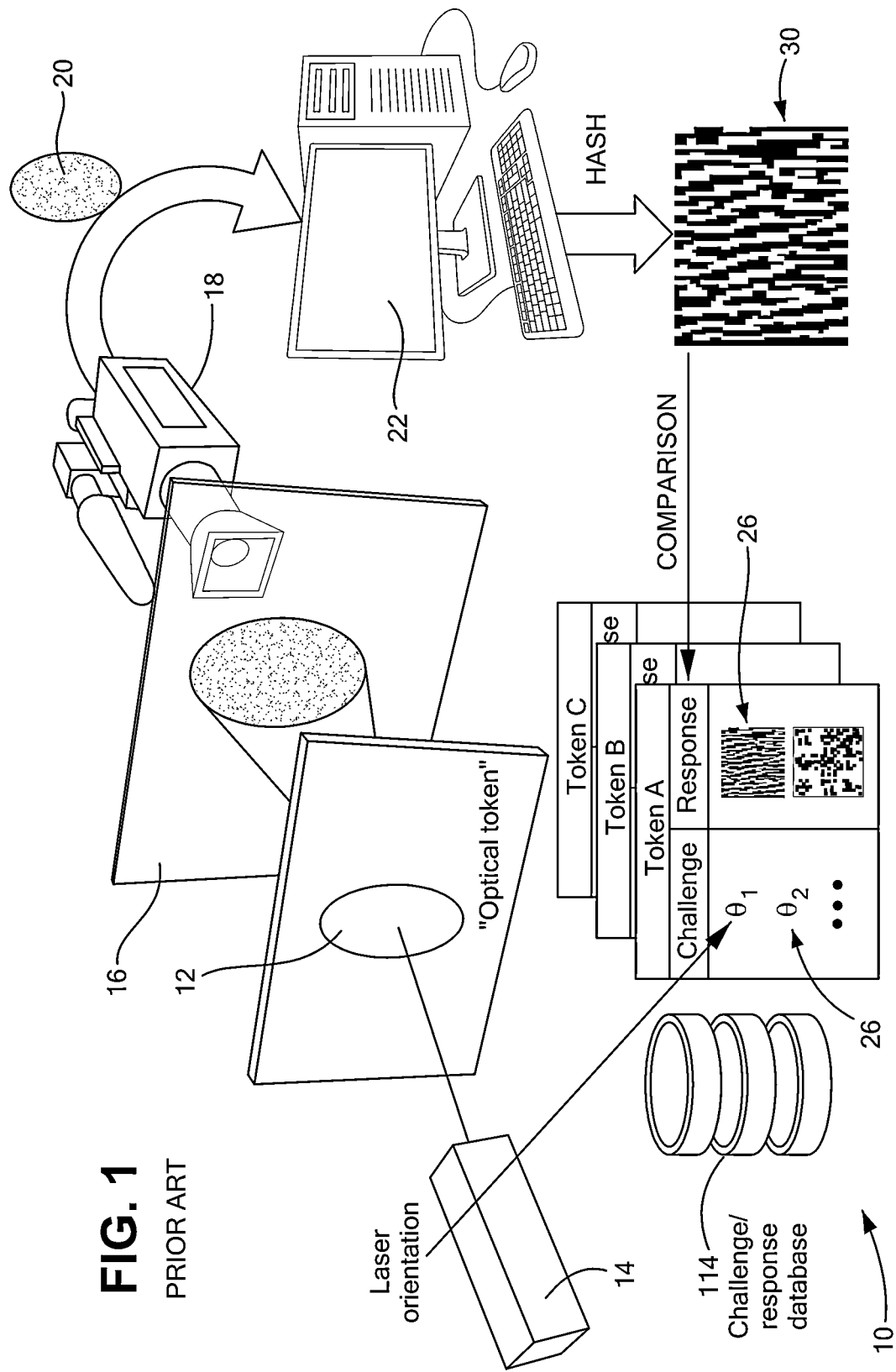
FIG. 1 is an exemplary diagram of a prior art system for challenging a prior art optical PUF which has scattering particles.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

As described herein, at least some embodiments provide a system and method to establish authenticity of a device, component, and/or system. Certain embodiments provide a unique type of a hardware based Physical Unclonable Function (PUF). For example, certain embodiments herein include, but are not limited to, a PUF structure that includes layers of quantum dots (QDs) of differing colors which are configured to be excited by a plurality of excitation sources (e.g., arranged in an array, but this is not limiting), where the excitation sources include one or both of coherent excitation sources (such as laser diodes) and incoherent excitation sources (such as light emitting diodes, with a structure or package integral (contained within the package or structure that the PUF is in) detector array that could, for example, be a complementary metal oxide semiconductor (CMOS) imager focal plane array (FPA). Certain embodiments herein include, but are not limited to, implementations of the above-described PUF structure (i.e., with layers of QDs of differing colors and built-in excitation source and built-in detector) that can be implemented as part of a coating or other adaptable and flexible structure, which can for example, be applied to any type of three dimensional structure, including structures having rounded surfaces, corners, depressions, openings, and the like.

In some embodiments herein, security of devices, systems, and/or components, makes use of a challengeable Physically Unclonable Function (PUF) (defined further and more extensively herein), in a device, component, or system, to help authenticate the device, component, or system to another entity. In some embodiments herein, security of devices, systems, and/or components makes use of a PUF which is self-authenticating even independent of receiving a challenge, PUF output itself can serve as a means of authentication simply by virtue of its existence (e.g., devices which are not authentic might not even contain the PUF and thus could not produce an output that could only have come from an internal, externally unrevealed PUF). In some embodiments herein, security of devices, systems, and/or components makes use of a PUF whose output is used (either directly of after digital/mathematical processing, e.g.) for another security purpose, such as serving as a key to access another function or entity, or as a seed or other factor used to develop an encryption key. Those of skill in the art will appreciate that the unique PUF structures herein are adaptable to virtually any application for which PUFs are used. In brief, a PUF is a hardware based construct that takes advantage of either manufacturing imperfections (an inherent source of entropy in devices) or intentionally inserted, unpredictable variations, to extract or generate a unique identifier that is associated with a device. PUFs have been used to verify and detect modifications to hardware and control operations based on the information the PUF provides (see, e.g., commonly assigned U.S. Pat. No. 10,452,872, entitled "DETECTION SYSTEM FOR DETECTING CHANGES TO CIRCUITRY AND METHOD OF USING SAME," and also commonly assigned U.S. Pat. No. 10,445,531, entitled, "AUTHENTICATION SYSTEM AND METHOD," each of which is hereby incorporated by reference). In certain embodiments herein, these PUF features and/or other features of PUFs are further applied extended to use the PUF as part of a structure that includes an embedded excitation source and an embedded detector. This is explained further below.

In some embodiments, the PUFs that are used for authentication, also can be usable to protect information stored on the component, device, or system itself, and/or to protect a component, device, and/or system itself during other processes, such as during booting. In some embodiments, as noted above, the PUF itself may be used for other system or device functions (e.g., access to another entity or function, as a seed for an encryption key, etc.) in addition to or instead of, for authentication.

The following detailed description is provided, in at least some examples, using the specific context of a PUF configured for use with a component such as an integrated circuit, but those of skill in the art will appreciate that this is merely exemplary and not limiting, and that the embodiments herein have applicability to many different kinds of devices, circuits, and systems that can have PUFs as part of them, especially where there needs to be controls and authentication involved in authenticating, accessing, and/or operating components, devices, or systems, especially without user interaction, where the component, device, or system, is configured to include an optionally challengeable and unique physically unclonable function (PUF) that is a part of the component, device, or system itself. In addition, although the examples herein are showing the PUF (especially the layered structure, described further herein) as a series of linear layers, the embodiments herein are not limited to those types of structures, but also can include structures that are formed as part of applying coatings or other types of layers to objects such as three dimensional objects.

For convenience, certain introductory concepts and terms used in the specification are collected here. The following terminology definitions may be helpful in understanding one or more of the embodiments described herein and should be considered in view of the descriptions herein, the context in which they appear, and knowledge of those of skill in the art.

"Internet of Things" (IoT) refers at least a broad range of internet-connected devices capable of communicating with other devices and networks, where IoT devices can include devices that themselves can process data as well as devices that are only intended to gather and transmit data elsewhere for processing. An IoT can include a system of multiple interrelated and/or interconnected computing devices, mechanical and digital machines, objects, animals or people that are provided with unique identifiers (UIDs) and the ability to transfer data over a network without requiring human-to-human or human-to-computer interaction. Even devices implanted into humans and/or animals can enable that human/animal to be part of an IoT.

"Physical unclonable function (PUF)" at least refers to a hardware based construct that takes advantage of manufacturing imperfections (an inherent source of entropy in devices) to extract or generate a unique identifier that is associated with a component, wherein the unique identifier can serve as a "fingerprint" for the device and, due to inherent and/or unexpected and/or intentional variations in the device itself (e.g., manufacturing variations, naturally occurring physical variations, etc.) enables the "fingerprint" to be so unique that it cannot be cloned. For example, analog physical measures such as doping levels or physical dimensions can give rise to different threshold voltages of transistors, which can be quantized into a unique value that can be a PUF characteristic subject to a challenge. In another example, switching delays and other effects can be sampled and quantized to a digital value that can be part of a PUF's response to a challenge. These can be inherently part of manufacture and not intentionally introduced, in some examples. Due to the impracticality of controlling physical parameters at this scale, the exact functionality implemented by a PUF is deemed unclonable. Thus, PUFs can be used as a security primitive to enable device-based identification, and authentication. At the point of manufacture of a device embodying a PUF, the PUF is subjected to one or more challenges, and the response to these challenges is taken and recorded. The challenge response information can, for example, be provided as documentation to an entity that in the future will need to challenge the PUF. The recorded challenge information helps to ensure that, if the challenge is repeated at any point and the PUF's expected response is verified, the device containing the PUF can be concluded to be same as the one characterized previously (at the time of manufacture). Advantageously, PUFs are configured to be robust (stable over time), unique (such that no two PUFs are the same), easy to evaluate (to be feasibly implemented so that challenges can be formulated to the PUF in a usable manner for the application), difficult to replicate (so the PUF cannot be copied) and very difficult or impossible to predict (so the responses cannot be guessed). A PUF also may be created or derived using one or more physical properties of a device or physical performance of a device, where such physical properties and randomness are intentionally added during manufacture. That is, for a given PUF, its source of uniqueness can be created in an explicit manner, such as through the deliberate addition of extra manufacturing steps that add unique aspects, or created in an implicit/intrinsic manner, as part of the manufacture processes variations, as noted above.

"Optical PUF" at least refers to PUFs that make use of the properties of emitted and/or reflected light to evaluate randomness of the object towards which the light is directed. Some optical PUFs work with objects that have explicitly introduced randomness. Some optical PUFs rely on the interaction of visible light with a randomized microstructure. For example, FIG. 1 is an exemplary diagram of a prior art system 10 for challenging a prior art optical PUF 12 (sometimes in the form of an "optical token" as shown in FIG. 1) which has scattering particles (not shown) embedded therein. The exemplary prior art optical PUF 12 can be formed using a transparent or optically "clear" material that is doped with randomly placed scattering particles, so that when light (e.g., a laser 14 at a certain orientation) is applied to the transparent material, the light reaches the particles in the prior art optical PUF 12. In the prior art optical PUF 12 of FIG. 1, the camera 18 is used to detect a type of speckle image/pattern 16, that arises when a laser 14 at a specific orientation, shines through the prior art optical PUF 12. In contrast, as discussed further herein in connection with FIGS. 2-14, the optical PUF of at least some embodiments herein, is configured to give rise to a unique spectral intensity pattern that is generated via built-in excitation sources, where the unique spectral intensity pattern that is generated is captured via an integral detector array, applied in a near field non-imaging configuration, where no imaging optics are involved. Thus, the unique spectral intensity pattern of the embodiments herein is captured (e.g., via focal plane/one or two-dimensional detector array—in this case non-imaging near-filed configuration without involving imaging optics) or otherwise measured, as described further herein. In the exemplary prior art optical PUF 12 of FIG. 1, in contrast, uses an imaging camera, where the prior art optical PUF 12 of FIG. 1 can receive a challenge 26 that consists of a specific point and angle θ of incidence of applied light, where a plurality of possible challenges 26 and expected responses 28, can be stored in a challenge/response database 214. The camera 18 or other sensor can capture the resulting speckle image/pattern 16 or image, and the captured speckle image/pattern 16 can be converted or transformed (e.g., by an image transformation process) into a fingerprint-like response (e.g., a "fingerprint" speckle pattern, as in fingerprint 20) that can be further processed at a computer 22 (e.g., via known process for image processing and transformation, such as a hash), into a an expected response 28, that is stored, along with the challenge 26, in the challenge/response database 214. Because the speckle fingerprint pattern 20 of the prior art optical PUF 12 of FIG. 1 is unique, the hash of that speckle fingerprint pattern should be unique, and thus the expected response 28 to the challenge, should be unique and can be used is used to validate the prior art optical PUF 12 (and, thus, to validate any component, device, or system to which the prior art optical PUF 12 is installed or coupled). An example of expected hash can correspond to an image of an expected response 28, as shown in FIG. 1, or also can correspond to a stream of digits or bits, as will be appreciated, where the expected response 28 can be compared with the actual received response in the form of the speckle fingerprint pattern 20 (which arises from challenging the prior art optical PUF 12), to determine if there is a match. In some variations, the prior art optical PUF 12 can be formed as a coating or token that is coupled to another article. With many optical PUFs of the embodiments described herein (e.g., FIGS. 2-14), no microelectronic or silicon circuitry on the PUF itself or any PUF-carrying object is required in order to challenge the PUF. Rather, when light (e.g., via the integral excitation source, described further herein) is applied to the PUF embodiments described herein, the interaction of the light with the randomly distributed scatterers produces a spectral/intensity an image pattern resolved by the 2-D focal plane array elements in a non-imaging configuration where the spatial resolution is defined by the array element/"pixel" size/extent. This 2D array resolved spectral/intensity data set is then unique. In addition, by incrementally modifying the position or angle of incidence of the input light, it is possible to generate and record patterns that are uncorrelated to one another, unique to the PUF being illuminated, and hard to predict via simulation or modeling. In some variations, such as the embodiments of the optical PUFs discussed herein, the light emitter, scattering medium, and light detectors are integrated into one enclosed package. The spatial-spectral-intensity pattern can be achieved by transmission of light through the structure and/or by light entering the structure and being reflected back.

"Challengeable PUF," at least refers to a PUF that is capable of accepting an input from some kind of a source (e.g., an input from a user, sometimes referred to as a "challenge," where the user can be any other entity, including a human, another device, another circuit within the same device, a software module, a source of a signal or light, laser, etc.) and wherein the challenge generates unique responses to the input, based on the physical fingerprint of the device. The unique challenge-response behavior of a particular PUF has a strong resemblance to biometric identifiers from human beings. Using a challengeable PUF, the identity and authenticity of a device can be established, helping to eliminate any means of spoofing the device. In some embodiments herein, the challenge corresponds to a particular kind of electrical signal configured to stimulate a particular challengeable PUF, and the response is a spectral pattern that is unique to a given PUF. Advantageously, in certain embodiments herein, the PUF is a so-called "strong PUF," shall be strong, meaning that the PUF has an exponentially large challenge/response space. In some embodiments herein, the PUF is not required to be challengeable but can instead be configured to provide an output independent of whether or not the PUF receives an external challenge. For example, in some embodiments, the PUF is configured to provide an output periodically or continually, that an external device, system, and/or component may use, to perform operations, access other functions, etc.

"Strong PUF" refers at least to a PUF having an exponentially large challenge and response space, which means that a complete determination/measurement of all challenge-response pairs within a limited time frame (such as several days or even weeks) is effectively impossible. In addition, with a strong PUF, it is difficult for an adversary to numerically predict or guess a response of the strong PUF to a randomly selected challenge, even if the adversary has knowledge of other challenge-response pairs. Examples of strong PUFs include, but are not limited to, an optical PUF (which relies on applying a specific light source laser to an optical scattering object at a certain angle and incidence point, to produce a multi-bit interference pattern arising from complex light scattering process inside the optical scattering object).

"Challenge," at least refers to an electrical signal, such as a light signal, applied to or presented to a PUF to elicit a response, where the electrical signal has characteristics that cause the PUF to respond and/or produce an output in a completely unpredictable and unique manner.

"Response," at least refers to a response from the PUF that comprises a unique "signature" or fingerprint that the PUF creates responsive to/due to a particular challenge. The type of challenge and response can, in some instances, depend on the type of PUF being used. Some PUF devices can automatically produce a response independent of a challenge; that is, the PUF may include or be incorporated as part of an assembly that contains a built in challenge configured to cause the PUF to provide the unique signature. In certain embodiments herein, the unique signature is a spectral signature.

"Helper data," at least refers to digital data utilized by some PUF designs to stabilize and compensate the output of the PUF due to environmental effects (for example, if a PUF output varies slightly from what is expected due to ambient temperature, circuit noise, etc.). The helper data, in some embodiments, can be generated by a helper data algorithm (which may or may not be part of the PUF itself, and could in some embodiments be part of a device into which a PUF is embodied), and can serve as a kind of post-processing or error correction to the PUF output. Consider that, for some types of PUFs, for certain classes of authentication applications, a device containing a PUF is authenticated if the regenerated response is "close enough" in Hamming distance (e.g., t minimum number of errors that could have transformed one string of bits into the other) the provisioned or predicted response, For these types of PUFs, errors in PUF responses can be forgiven up to a certain predetermined threshold, and still be considered a match. In contrast, for some other types of PUFs (e.g., for PUFs used in cryptographic applications to generate keys), the "noisy" bits need to be error corrected, with the aid of helper bits, commonly referred to as a Helper data. The greater the environmental variation a PUF is subject to, the greater the possible difference (noise) between a provisioned/predicted PUF response and a re-generated (actual) response. Thus, to make use of the physical nature of PUFs for reliable authentication, in some embodiments, a helper data algorithm or fuzzy extractor, which can be part of the PUF or any device in which a PUF is installed, can be used to generate responses with appropriate entropy from noisy and non-uniform random PUF responses. Advantageously, in certain embodiments herein, the PUF uses helper data that contains no information or means to reverse engineer the original PUF output that is being "helped." In some embodiments, this helper data is also provided to a database of PUF data as part of PUF-specific data stored in that database.

"Quantum Dot" at least refers to a portion of matter (e.g., a semiconductor particle), often a few nanometers in size, whose excitons are confined in all three spatial dimensions. Consequently, such materials have electronic properties intermediate between those of bulk semiconductors and those of discrete molecules, and quantum dots generally have optical and electronic properties that differ from larger particles due to quantum mechanics. As such, they have the advantage of displaying properties of both bulk material and individual molecules. QDs also are known as "zero-dimensional electronic structures," and/or "colloidal semiconductor nanocrystals" and their semiconductor energy levels can be tailored by simply altering size, shape and charge potential. These energy levels result in distinct color identifications for different-sized QDs. QDs may be fabricated in the visible, near infrared, mid-wavelength infrared (MWIR), and long wave infrared (LWIR) spectral ranges. When QDs are illuminated by ultraviolet (UV) light (or any light with photon energy that exceeds the QD bandgap energy), an electron in the quantum dot can be excited to a state of higher energy. In the case of a semiconducting QD, this process corresponds to the transition of an electron from the valence band to the conductance band. The excited electron of the QD can drop back into the valence band releasing its energy by the emission of light. The color of that QD's light depends on the energy difference between the conductance band and the valence band. For example, larger size QDs create a decrease in energy band gap and emit large wavelength photons (red-shift), so can emit a red color. Small QD sizes have an increase in energy band gap and emit short wavelength light (blue shift). In between, there can be other colors corresponding to frequencies, such as orange, green, violet, etc., as will be appreciated. In addition, this effect is demonstrated by QD solutions of different particle sizes emitting different colors when exposed to a UV light source. Electronic characteristics of QDs are related to the size and shape of the individual crystal. Generally, the smaller the size of the crystal, the larger the band gap, the greater the difference in energy between the highest valence band and the lowest conduction band becomes. Therefore, more energy is needed to excite the QD, and concurrently, more energy is released when the crystal returns to its resting state. By varying the size of the QD, the confinement energy of the exciton can be controlled—and resultant colors can be tuned. This can equate to higher frequencies of light emitted after excitation of the dot as the crystal size grows smaller, resulting in a color shift from red (large size, low frequency) to blue (small size, high frequency) in the light emitted. In addition to such tuning, another advantage with QDs is that the confinement energy of the exciton can be controlled based on size. Exemplary applications of QDs are described further herein in the following commonly assigned U.S. Patents, which are all hereby incorporated by reference:

- U.S. Pat. No. 7,502,166 ("Optical sight having obscured reticle illumination");
- U.S. Pat. No. 7,916,065 ("Countermeasure system and method using quantum dots"), which shares an inventor in common with the present disclosure;
- U.S. Pat. No. 9,310,516 ("Quantum dot-based identification, location and marking");
- U.S. Pat. No. 8,213,473 ("Laser based on quantum dot activated media"), which also shares an inventor in common with the present disclosure; and
- U.S. Pat. No. 10,711,188 ("Process for producing quantum dots having broadened optical emission"), which also shares an inventor in common with the present disclosure.

"Quantum-Dot light emitter" (also sometimes termed "nano-dot") at least refers to a nanophosphor material formed of a mass of particles of phosphorescent material having particle sizes much smaller than the wavelength of visible light. These quantum-dot light emitters are excited by light of an excitation wavelength and emit light of an output wavelength. For example, quantum-dot light emitters 86 include materials such as cadmium sulfide, cadmium telluride, silicon, and germanium, processed with a surfactant to a very small nano-dot size much smaller than the wavelength of visible light, and encapsulated. Quantum dot light emitters are discussed further in commonly assigned, which is hereby incorporated by reference.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Given the rapid increase of fully-autonomous devices, such as IoT, there exists a critical need for self-contained, low size, weight, power, and cost (SWaP-C) self-authentication mechanisms that cannot be observed, bypassed, or falsified by an adversary. However, currently available self-contained, autonomous, self-authentication devices do not address these emerging needs. PUFs, as noted above, can serve as security primitives to generate a unique fingerprint/signature for use in hardware self-authentication and identification are needed. Known PUFs that are suitable for use in low SWaP-C applications are becoming increasingly able to be observed and falsified by modern adversaries, because many implementations use electrical implementations having relatively low bit density. Thus, to provide truly "unattainable" falsification, other approaches are needed, such as multi-dimensional, optical, spectral, heterogeneous randomized physically observable features with very high bit densities (e.g., bit densities that are orders of magnitude higher as compared to current electrical approaches) bit densities are the desired goal to provide for truly unattainable falsification.

One approach that has been used for PUFs with high bit density has been optical PUFs, such as optical modalities using fluorescent/phosphorescent particles (e.g., so-called "phosphor PUFs), which have been used as highly disordered entropy sources having high bit density. However, optical PUFS that use fluorescent/phosphorescent particles can have various shortcomings. For example, optical PUFS that use fluorescent/phosphorescent particles can require use of external imaging as part of verification, which renders them less than desirable for autonomous, self-contained, self-authentication purposes that require inaccessibility by external sources. In addition, optical PUFS that use fluorescent/phosphorescent particles are spectrally homogeneous, having no spatial depth or spectral diversity, and thus are tractable for adversaries to directly observe externally. Further, some optical PUFS that use fluorescent/phosphorescent particles utilize materials that are unstable under thermal and other environmental perturbations. Another type of optical PUF, that uses nano-technology features, has not been able to be used in a direction-specific way, where the signature is unique based on being challenged only from a specific direction, where there is an ability to precisely control the direction of excitation.

Thus, both electrical PUFS and some types of optical PUFS (e.g., those that use fluorescent/phosphorescent particles) do not have enough high entropy/high bit density and are vulnerable to attack and are insufficiently robust for next generation autonomous device protection.

Another challenge with some optical PUFs can be the process of sending or applying challenges and measuring responses. For at least some known optical PUF implementations, a somewhat precise validation arrangement (e.g., the arrangement, with specific angles of laser light as shown in the prior art configuration of FIG. 1) may be needed to send challenges to the PUF (e.g., apply light to the PUF) and receive responses from the PUF, to be able to validate the image pattern. For example, a validation system for optical PUFs that use scatterers may need to establish exactly the same relative positioning of the structure containing the scattering particles, the positioning of the light or other excitation source that is shined into the optical PUF (e.g., laser beam or incoherent light such as an LED), and the positioning of the optical sensor (e.g., charge-coupled device camera), for every read-out of the optical PUF, to ensure that the image pattern that is generated, is sufficiently identical to an expected or previously recorded, image pattern, to ensure that the PUF can be validated.

In certain embodiments, as described herein, an arrangement is provided to provide a PUF feature that employs quantum dot (QD) nanoparticles that are spectrally diverse (i.e., having varying bandgaps), where the QDs are configured in in a highly inhomogeneous (non-uniform), random distribution suspended in an optically transparent matrix/host, and wherein the challenges of validation are at least partially overcome by including built in excitation sources and sensors. In certain embodiments, this configuration provides for a highly random spatial distribution/entropy that is commensurate to very high bit densities. In addition, in certain embodiments, this configuration provides for optical-depth-specific absorption regions. This results in highly unique direction specific spectral signatures. The very high molar absorption coefficient of QDs ensures ample doping density variability in a thin low profile sub-layer geometry, well under ~mm scale. In certain embodiments, as described further herein, this spatially highly inhomogeneous architecture provides for asymmetric optical transfer functions that are configured to prevent observation via external means. In certain embodiments, the asymmetric optical transfer function is a non-reversible function that can serve as a PUF and is enabled by unique distribution and strategic layered ordering of QDs, as described further herein.

Figure 2:
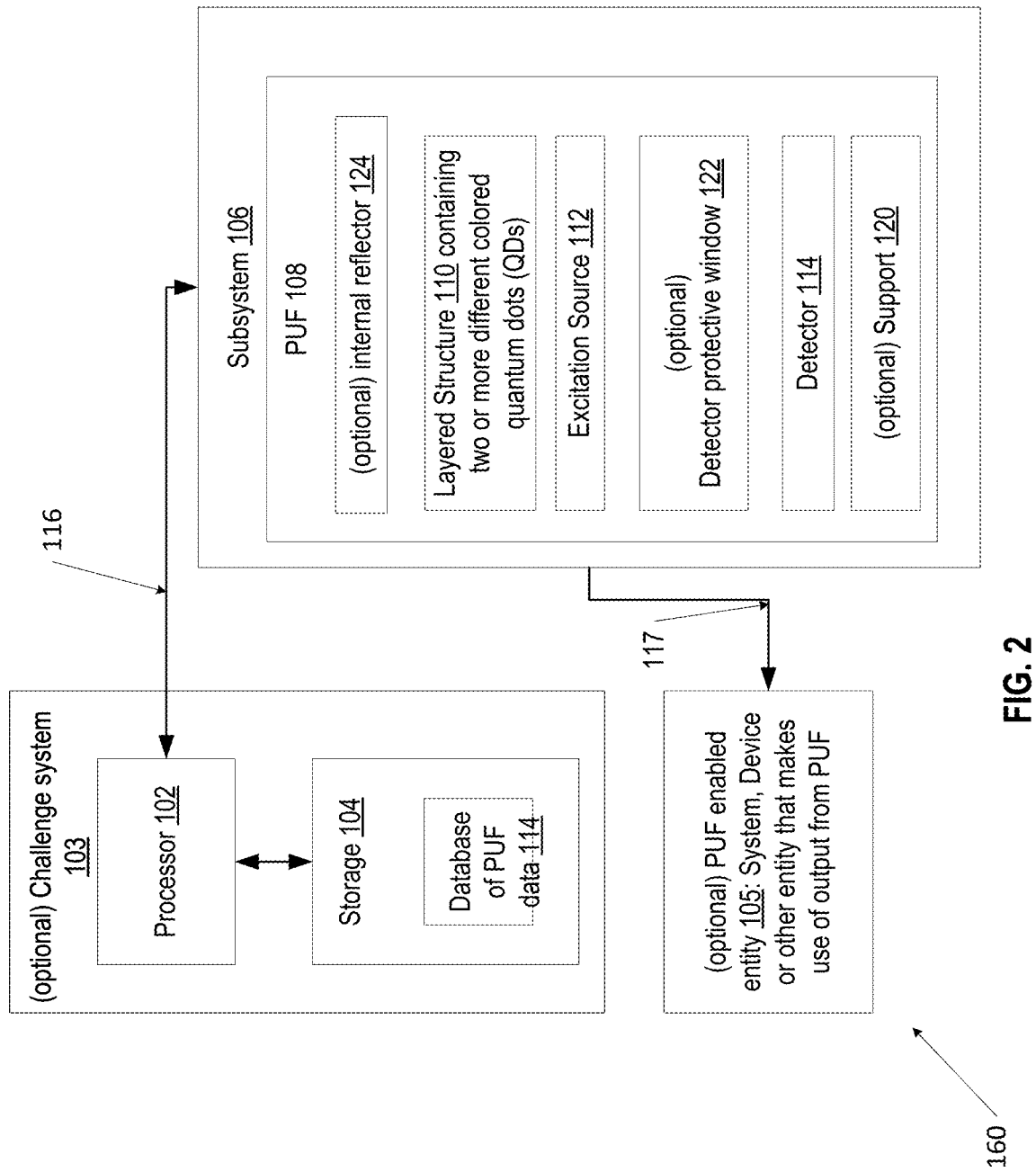
FIG. 2 is an exemplary high-level block diagram of a system including a subsystem having an integrated physically unclonable device (PUF), in accordance with one embodiment.

FIG. 2 is an exemplary high-level block diagram of a system 100 that shows multiple applications for the PUF structures described herein. The system 100 includes a subsystem 106 having an integrated physically unclonable device (PUF) 108, in accordance with one embodiment. The subsystem 106 (which contains PUF 108), in certain embodiments, is configured to provide a challengeable PUF that is responsive to (optional) challenge system 103 (discussed further below). In certain embodiments, the subsystem 106 is configured to provide a PUF that can provide an output usable by an (optional) PUF enabled entity 105, which can include, in certain embodiments, a system, device, component, function, or any other entity that makes use of output from the PUF (explained further herein in connection with FIG. 16). The optional challenge system 103 of FIG. 2 includes a processor 102 having storage 104 and which is in operable communication with a subsystem 106 (which can, for example, be any type of a system, device, component, structure, or any article of manufacture) having therein a self-contained, integrated PUF 108. In certain embodiments, the PUF 108 includes a layered structure 110, an excitation source 112, and a detector 114. Optionally, in certain embodiments, the PUF 108 can include a support 120 (e.g., a substrate) for the layered structure 110, excitation source 112, and/or detector 114. In other embodiments, the support 120 can be part of the subsystem 106 itself and also may include the excitation source 112 and/or detector 114. For example, in some embodiments, the support 120 can be an integrated circuit.

Optionally, in certain embodiments, the PUF 108 includes a detector protective window 122, configured to protect the detector 114 (e.g., if the detector 114 is implemented as a CMOS array, the detector protective window 122 can comprise a layer of a clear protective material which still permits operation of the detector while protecting it during manufacture and operation). Optionally, in certain embodiments, the PUF 108 includes an internal reflector 124 which is configured to re-direct unabsorbed light back into the layered structure 110; the internal reflector 124, in certain embodiments, also is configured to provide mechanical and electrical protection for the layered structure 110.

FIG. 2 is intended to show, at a very high level, a subsystem 106 embodying the high-entropy, self-contained, externally unrevealed PUF 108 that is discussed further herein in connection with FIGS. 3-17, along with two optional, possible applications for the PUF 108. The storage 104 of challenge system 103 includes, in certain embodiments, a database of PUF data 118 that is associated with potential expected responses from the PUF 108 of the subsystem 106. For example, the database of PUF data 118, in certain embodiments, can include responses to challenges that the processor 102 can pose to the PUF 108 and to which the PUF 108 will provide unique responses. In certain embodiments, the database of PUF data 118 can store one or more digital fingerprints associated with fielded PUF devices, such as PUF devices that are configured for coupling to or being installed into, various articles of manufacture, including but not limited to semiconductor chips. In certain embodiments, the database of PUF data 118 can include information relating to helper data (as described above), if any, associated with a PUF 108 of subsystem 106. Helper data may not be required or used in all embodiments, as will be appreciated. The storage 164, in certain embodiments, is implemented using any type of storage for computing devices, including but not limited to disk drives, a solid-state drives, a flash drives, a removable media drives, etc. The processor 102 is in operable communication with the subsystem 106, where the operable communications can be via any type of communication, be it wired or wireless, over the cloud, etc., so long as the communications are able to ensure that the processor 102 is able to evaluate an output from the PUF 108.

The processor 102 is configured to perform computational tasks related to at least one of sending challenges to and receiving responses from, the subsystem 106, via communications 116. In certain embodiments, the processor 102 can be implemented in various ways known in the art, such as a microprocessor, field-programmable gate array (FPGA), complex programmable logic device (CPLD), system on a chip (SOC), or any device or system configured for performing computing tasks Advantageously, use of a single processor, such as processor 102, in certain embodiments, performs both sending challenges and receiving responses, but this is not required. For example, in some embodiments, the processor 102 is configured to send a challenge to the PUF 108 and receive a challenge response, via communications 116. In a further example, in some embodiments, a system 100 may have more than one processor 102, where a first processor sends a challenge (or even a command for another system, including one at the subsystem 106, to initiate a challenge), and a second processor receives the response to the challenge, and the first and second processors in such an arrangement may or may not need to be in operable communication with each other. In some embodiments, a processor 102 may be configured to only receive responses from the PUF 108, wherein the PUF 108 may be configured to continually or periodically output its unique digital fingerprint during operation, so that no sending of challenges is necessary.

The challenge response (which can be part of communication 116) may be in the form of a digital readout, spectral image, spatial-spectral-intensity image pattern, or other output from detector 114. In addition, in certain embodiments, the PUF output 117 likewise may be in the form of a digital readout, spectral image, spatial-spectral-intensity image pattern, output from detector 114, or even a signal that is indicative about information relating to the PUF, such as whether or not a PUF output even exists. Depending on the subsystem 106 in which a PUF 108 is installed, the subsystem 106 may perform processing on the challenge response before sending it to the processor 102 or may perform processing on the PUF output 117 before it is used by the PUF enabled entity 105. For example, the subsystem 106 may encrypt the challenge response or PUF output (or may even use the PUF output as part of generating an encryption key), may convert it from a spectral image to a string of characters or other output such as a hash, a digital fingerprint, etc. The subsystem 106, in certain embodiments, may include the challenge response or PUF output "as is" or 'as encrypted" as part of another communication along with other information, etc. In some embodiments, to compensate for possible environmental conditions at the PUF 108, the subsystem 106 may utilize helper data (as defined previously) for either a challenge response or a PUF output. In certain embodiments, the processor 102, upon receiving the challenge response, is configured to evaluate whether the response from the PUF 108 is correct, by performing certain computations (if necessary) and then comparing either the challenge response from the PUF (whether as received or as further processed) with data stored in the database of PUF data 118. In certain embodiments, the PUF enabled entity 105, upon receiving the PUF output, will be enabled or not, or may perform certain functions, depending on the PUF output (including whether or not it exists).

The database of PUF data 118, in certain embodiments, is determined, received, provided and/or otherwise obtained as part of configuring the system 100. In certain embodiments, database of PUF data 118 includes not only expected data from the PUF, but also information about the helper data for the PUF 108 There are a number of ways to obtain this data, as will be appreciated. For example, at the time a device (or set of devices) embodying or including the PUF 108 is manufactured, the manufacturer can subject the PUF 108 to one or more types of challenges and then record the response to the challenges as exemplary characteristics of that PUF 108, to be saved as PUF data for the database of PUF data 118. The manufacturer can provide this information as characteristic data to one or both of the manufacturer of the PUF 108 and/or of the subsystem 106, at the time the PUF 108 is installed into or is made accessible to the subsystem 106. For example, if the PUF 108 is embodied into or coupled to an electronic component or circuit board, information or paperwork that accompanies the component or circuit board, when it is shipped, may include information relating to the expected responses from the PUF 108.

Once the particular expected response data for the PUF 108 is obtained determined and/or received, the expected response data (including, in certain embodiments, helper data, digital fingerprints, hashes, etc.) can be stored in the database of PUF data 118. Optionally, in certain embodiments, information relating to the challenge that produced the expected response data, also can be stored along with the expected response data. Once stored, it can be known that if a challenge is performed that repeats conditions present when the unique data for the PUF 108 (i.e., spectral signature) was created, including the particulars on which excitation sources 112 were activated, their angles, etc., if the response to that challenge matches (to whatever degree defined by a given application, e.g., within a Hamming distance), then there is reasonable certainty that the PUF 108 being checked, that created the response to the challenge, is the same PUF 108 that was used to generate the expected response.

Figure 3:
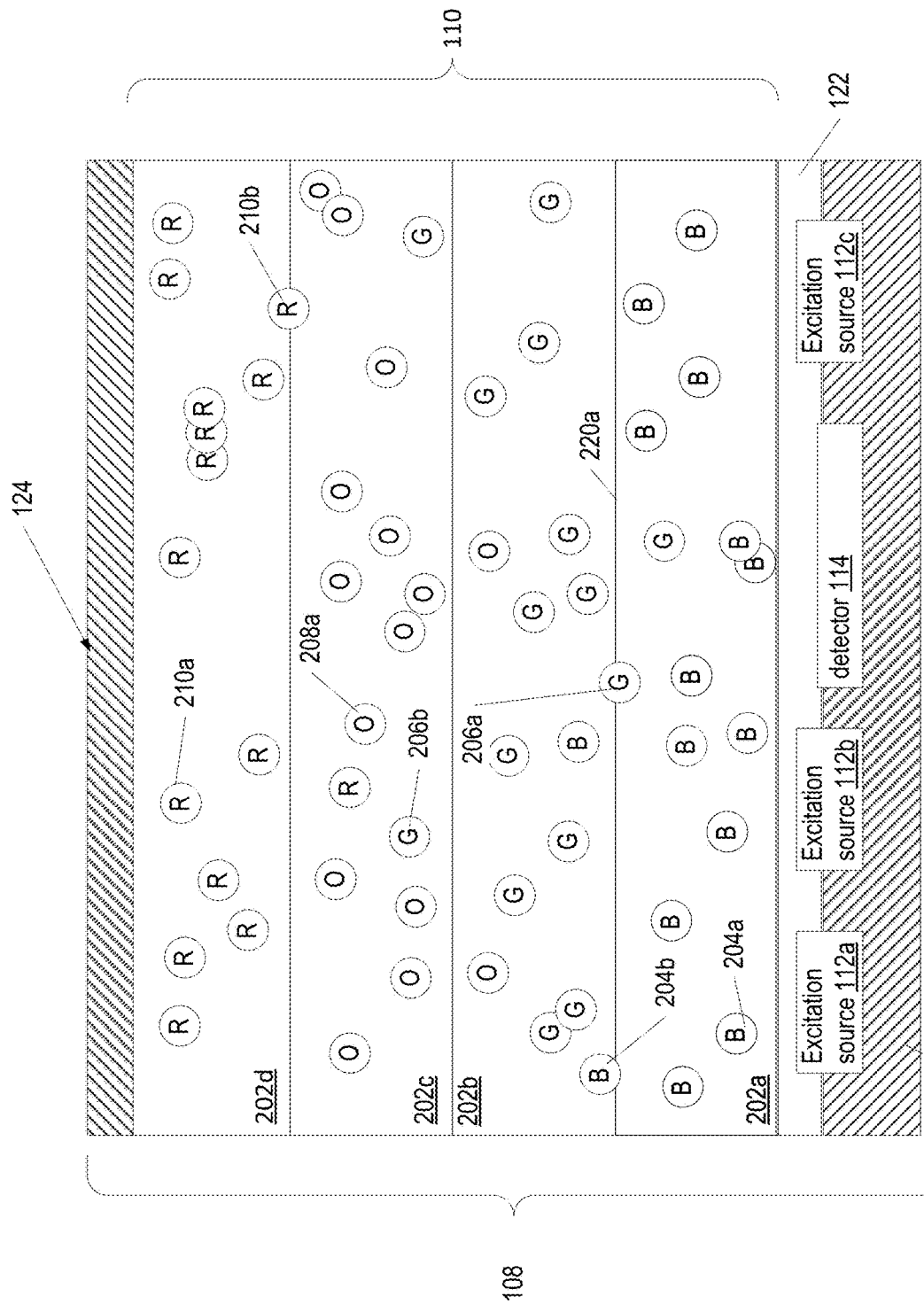
FIG. 3 is a first exemplary cross-section view of an embodiment of FIG. 2, showing a portion of a layered structure of the PUF of FIG. 2.
Figure 4:
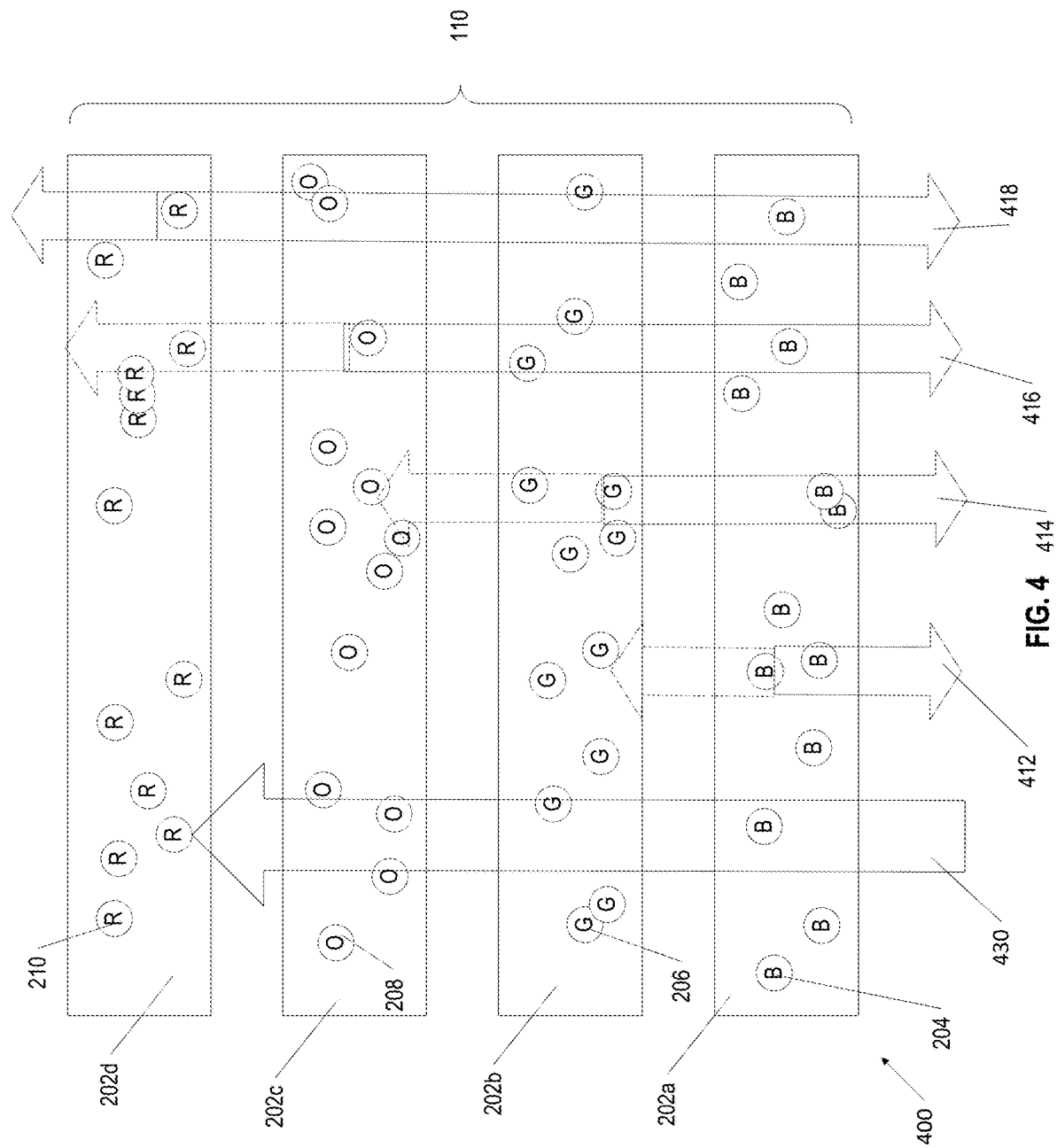
FIG. 4 is an exemplary exploded cross section view of the portion of the structure shown in FIG. 3, showing direction of light from one or more exemplary excitation sources and co-propagating directions of excitation, in accordance with one embodiment.
Figure 5:
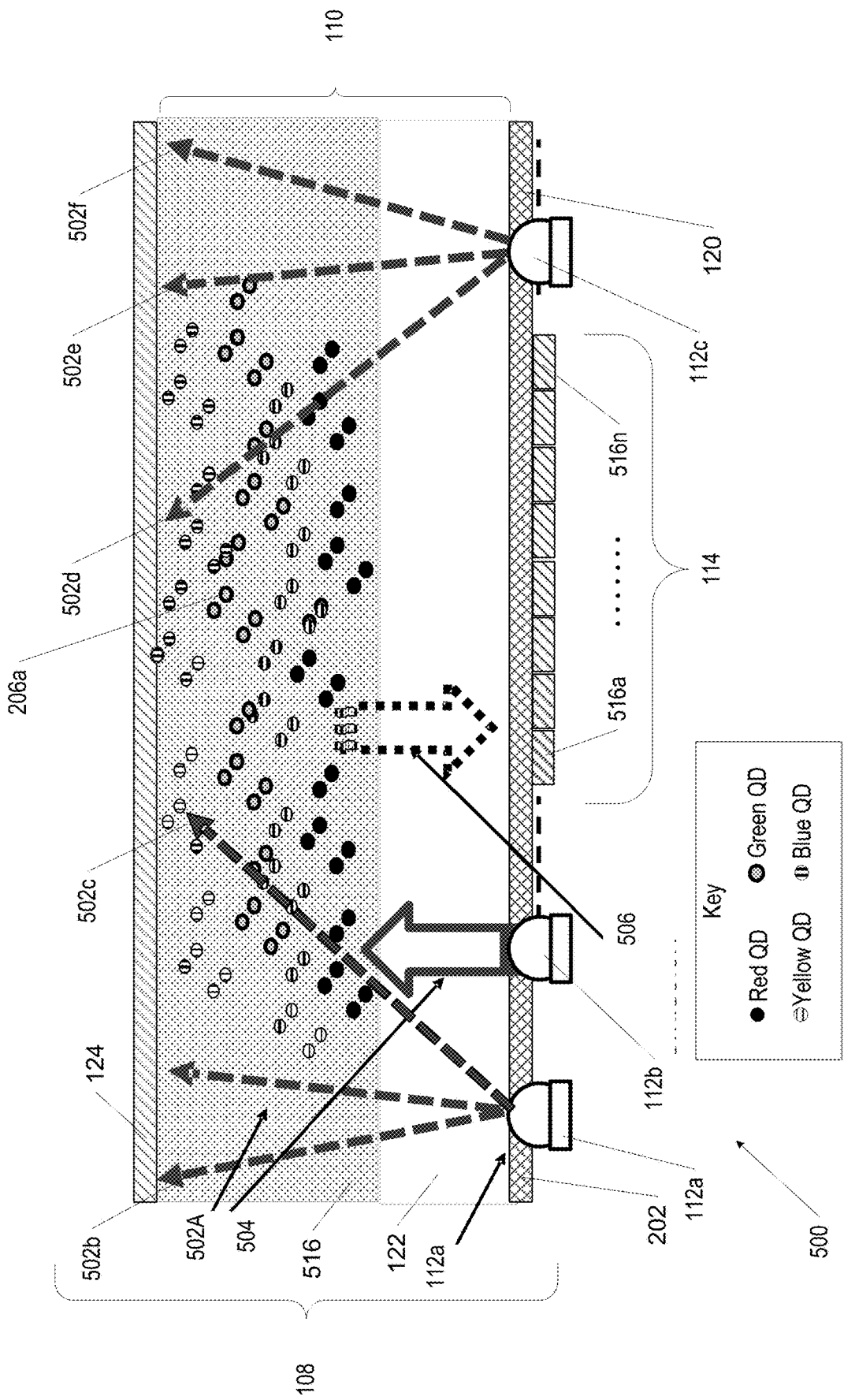
FIG. 5 is an exemplary cross section view of an excitation and emission detection architecture similar to that of FIG. 3, show direction of excitation and emitted light, in accordance with one embodiment.

Reference is now made to FIGS. 3 and 4, which both show cross sections of the PUF 108 of FIG. 2, showing certain features of those embodiments, and also to FIG. 5, which is an exemplary cross section view of an excitation and emission detection architecture similar to that of FIG. 3, showing direction of excitation and emitted light, in accordance with one embodiment. In particular, FIG. 3 is a first exemplary cross-section view 200 of an embodiment of the PUF 108 of FIG. 2, including a view of a portion of a layered structure 110 of the PUF of FIG. 2 and also showing its connection to the optional support 120, optional detector protective window 122, and optional internal reflector 124, where the PUF 108 includes built-in excitation sources 112 and built-in detector 114. FIG. 4 is an exemplary exploded cross section view of the portion of the layered structure 110 shown in FIG. 3, showing directions of propagating light via arrows 412, 414, 416, 418 as a result of the QDs being impinged on by light from one or more exemplary excitation sources (the excitation sources 112, detector 114, detector protection window 122, and internal reflector 124 are not shown in FIG. 4, for clarity, but are similar in location and arrangement to those illustrated in FIGS. 3 and 5).

Figure 14:
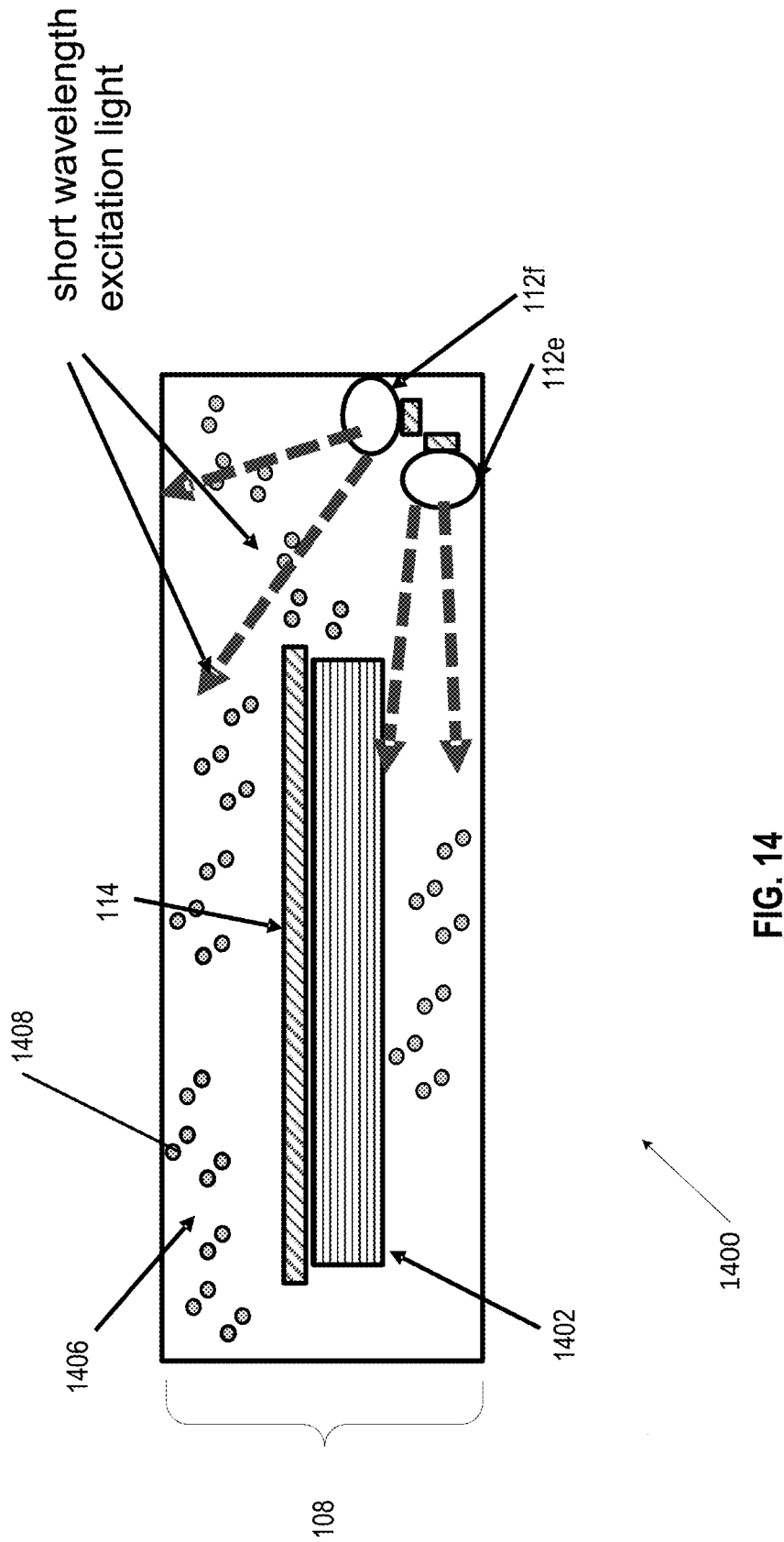
FIG. 14 is a second exemplary cross-section view of another embodiment of FIG. 2, showing the PUF 108 of FIG. 3 implemented via embedding a device within a dispersion medium that also has QDs embedded therein, in accordance with one embodiment.

Referring still to FIGS. 3-5, the layered structure 110, having QDs of varying exciton/band gaps (as described further below), helps to provide for a non-reversible and unidirectional spectral signature of the PUF 108, as will be explained further herein. One or more of the excitation sources 112 can be activated to shine a light through the layered structure 110. Note that the detector protective window 122, as shown in the embodiments of FIGS. 3 and 5, is configured, in certain embodiments, to also be disposed over the excitation sources 112, but it is not required that the detector protective window 122 also cover the excitation sources 112. Advantageously, if the detector protective window 122 covers the excitation sources 112, it is configured to be sufficiently optically clear so as to be able to transmit the excitation itself, without substantial losses, as will be understood. Optionally, one or more of the excitation sources 112 can further be configured to shine light into the layered structure in a particular direction wherein the light from the excitation source will get absorbed by all layers 202 with decreasing intensity depending on the overall attention and optical density of the conglomerate (i.e., the total number and path of QDs that the light from the excitation source hits). As the QDs are hit by light from the excitation source 112, the QD will emit (scatter) light of a corresponding color, in multiple directions, and the scattered light also interacts with other QDs, which also scatter that light as well as light that impinges on the QDs from one or more of the excitation sources 112, as will be understood. The detector 114 is configured to detect the patterns and colors of emitted light as those patterns etc. are reflected and/or scattered back towards the detector 114. In some embodiments, the detector 114 corresponds to a CMOS detector array. In some embodiments, the detector 114 is a device that can include a readout integrated circuit (ROIC). In addition, in some embodiments, the detector can detect patterns and colors even for QDs that are relatively distant from the detector 114, because, in the arrangement of FIG. 3, the QDs have an interdependence with each other and light emitted from certain QDs can impact light emitted from other QDs, and this interdependence can exist throughout a substantial portion of the PUF 108, even if the PUF 108 is part of a structure or coating formed on a three-dimensional object, such that certain QDs may not be in direct alignment with detector 114. For example, in certain embodiments, even if the PUF structure wraps around a corner, with a certain portion of quantum dots separated from and at an angle away from the detector 114, because of the interdependence of the QDs and the impact emitted light has from QDs, the detector would still be able to see patterns that are impacted by more distant QDs. This also is illustrated in FIG. 14, described further herein.

For example, FIG. 5 is an exemplary cross-section view 500 of an excitation and emission detection architecture similar to that of FIG. 3, show direction of excitation and emitted light, in accordance with one embodiment. FIG. 5 helps to illustrate the concepts of at least one embodiment. In the example embodiment of FIG. 5, the cross-section view 500 includes a layer corresponding to the detector protective window 122 of FIG. 2. The detector protective window 122, in certain embodiments, is a layer of a transparent material (e.g., a glass or polymer) configured to provide a protective window for the detector array 114 (which can, in certain embodiments, be a CMOS detector array). In certain embodiments, the support structure 120 and detector protective window 122 optionally can be configured around the excitation source(s) 112 and the detector array 114 as a waveguide excitation coupler, as will be understood. In certain embodiments, as shown in FIG. 5 but not depicted in FIGS. 2 and 3 (for clarity), the PUF 108 also includes a reflector layer.

In the example embodiment of FIG. 5, the excitation sources 112s-112c emit short wavelength excitation light 504, which can take on, in certain embodiments, a spatially diverging emission profile represented by the dotted arrows 502a, 502b, 502c, in the example of excitation source 112a. In response, the QDs (which are shown as the multiple small dots in FIG. 5, with varying patterns denoting colors, as shown by the key of FIG. 5. As an example, some of the QDs labeled, e.g., green QD dot 206a, but all QDs having the pattern that matches the key are intended to be that respective color of QD. The QD dots produce emission of lights, such as the various fluorescence emissions 520, 522, 524, 526, which 506, which are generally directed in direction 506, to be detected by the elements 516 of a detector 114. For example, in some embodiments, as shown in FIG. 5, the detector array 114 is a CMOS detector array having a plurality of elements 516.

In certain embodiments, when one or more the excitation sources 112 are controlled to create an excitation, the respective excitations may form one or more respective "light cones" (as will be understood in the art) that are emitted to the QDs inside the layered structure 110. In response, the QDs being impinged on emit light in one or more directions, including, in some embodiments, in a respective conical shape. The excitation provided by the excitation sources 112 is all internal to the QD, as are the responses, which are detected by the built in detector 114. In certain embodiments, for different PUF-challenges, different and independent regions of the structures are illuminated predominantly (e.g., by different excitation sources 112) and cause different respective responses. This independence of stimulation, combined with the uniqueness of the excitation, detecting, and scattering within, and aforementioned interdependence of the QDs, complicates or even directly prevents straightforward forms of modeling attacks. In addition, the vast number of different possible configurations of excitation of excitation sources 112 helps to reduce the change that a given PUF output spectra can be modeled by some simple form of superposition of known signals. In addition, the internal reflector 124, as noted above, helps as well to serve as a cover structure that to both conceal the PUF spectra therein and to provide a further element to reflect light within the layered structure 110. This is also explained further below, particularly in connection with the description of graphs 632-638 of FIG. 4. In certain embodiments, the internal reflector 124 can be made of a metallic material, such as gold.

In certain embodiments, the multiple directions of emitted light combine, at different layers, as the light from a colored QD in one layer emits light that potentially (depending on wavelength) be added to excitations from previous layers or can block excitation from other layers (depending on wavelength). Specifically, by strategically layering different QDs of varying band gaps, which have differing responses to various wavelengths of light, the complexity of the resulting PUF "fingerprint" is increased over existing optical PUFS, and, further, this creates an artificially engineered, non-reversible optical transfer function (i.e., will look different depending on which side it is viewed from), which can be extremely difficult to duplicate and is able to provide a full sphere ($4\pi$ steridians) of protection.

Referring still to FIGS. 3-5, FIG. 3 illustrates, for explanatory purposes and by way of example, a layered structure 110 having a delineation of layers 202 that shows defined boundaries. As shown in FIGS. 3-4, although the layers 202a-202d have an illustrated demarcation or boundary (e.g., boundary 220a) between layers 101, in certain embodiments, the boundary is substantially invisible and is not a strict or clear cut delineation, but rather is somewhat blurred or loosely defined, in the form of a transition zone, with some mixing between the QDs of one type (first band gap, first color, first size e.g.) in one layer and the QDs of another type (second band gap, second color, second size, e.g.) in another layer. This enables a gradual or random transition between a first region containing a random distribution of mostly QDs of a first type and a second region containing a random distribution of mostly QDs of a second type. A layer 202 can be combined with as many further layers 202 as desired.

The layered structure 110, in the example embodiment of FIGS. 3-4, shows four layers: 202a, 202b, 202c, 202d, each with a different type of QD, but this is exemplary and not limiting. In certain embodiments, the layers 202 are made of a material, through which the light passes, which is sufficiently optically clear and/or transparent to allow light from the excitation source 112, to pass through the respective layer 202, so as to create a desired PUF spectra (this is also further discussed herein in connection with FIGS. 6A-15). In some embodiments, it may be desirable to have a layer 202 be made of a material that is not necessarily completely optically "clear," which also serves another purpose for the structure (e.g., to provide conductivity, insulation, etc.), so long as at least enough light is able to be emitted to be picked up by the detector 114.

In certain embodiments, usable materials for the layer include, but are not limited to, organic materials able to transmit light, e.g., combinations of one or more materials, including but not limited to a combination of one or more hybrid polymer mixes, various polymers and/or transparent polymers (such as polyethylene (PE), polypropylene (PP), polycarbonate (PC), or polymethylacrylate (PMA), polymethylmethacrylate (PMMA), cellulose acetate butyrate (CAB) silicone, polyvinylchloride (PVC), polyvinyl alcohol (PVA), polyethylene terephthalate (PET), and the like. The organic light transmissive materials also may include polymer matrix materials, polymer films, epoxies, resins etc. The layer in some embodiments may be formed of an inorganic material such as glass, crystal, quartz, and any optically transparent inorganic composite materials. In further embodiments, a layer may comprise an encapsulant material or a coating. In further embodiments, a layer may comprise a material that is conductive or non-conductive, depending on the needs of the application. Note as well that the material for layers may be selected based on compatibility with the material used for the QDs, as is understood in the art. In some embodiments, not all layers 202 are made from the same material. In addition, the QDs themselves may be disposed or encapsulated in a first polymer or other material, which is then applied to a second polymer or other material, to form the layer 202. As noted previously, the entire PUF 108 can be formed on top of or all around another structure, such as a three-dimensional structure, e.g., as a coating, film, encapsulant, etc.

Depending on the application, the layers 202 can be formed of specific, substantially transparent materials that also may serve other purposes in the subsystem 106 and/or meet specific environmental or operational requirements. For example, in some embodiments, the layers 202 can be part of an encapsulation material or coating for a semiconductor device or a circuit board or any other object. In some embodiments, layers 202 can be part of a heat transfer device or coating. In some embodiments, the layers 202 can be part of an adhesive. In some embodiments, one or more of the layers can provide electrical conductivity or electrical insulation. Those of skill in the art will appreciate that many possible materials are usable materials in which to disperse the plurality of random QDs 204-210. However, in at least some embodiments, it is important that the layers 202 are part of a layered structure 110 that forms a PUF 108 whose actual spectral emission, is not able to be detected externally, so this may mean that an entire PUF 108 is encapsulated, housed, or otherwise enclosed or covered (e.g., via aforementioned internal reflector 124), in another structure (not shown) advantageously a tamper evident type of structure, where attempts to get inside and analyze the PUF, can result in a destruction or otherwise rendering inoperable, of the unique aspects of the PUF.

For example, in certain embodiments, a PUF 108 can be contained within a tamper evident case or housing that is fixedly attached to the PUF 108, such that any opening of the tamper evident case or housing, breaks apart the PUF 108. In another example, the PUF 108 is configured to be part of or within an integrated circuit chip. It should be understood, as well, that embodiments that consist of a PUF 108 that comprises just the support 120, one or more excitation source(s) 112, detector 114, and layered structure 110, are by definition externally unrevealed, because applying an external optical stimulus cannot provide a true, matching optical signature from the PUF 108, since that signature can only be enabled by internal stimulation/excitation via the built in excitation source(s) 112.

Figure 15:
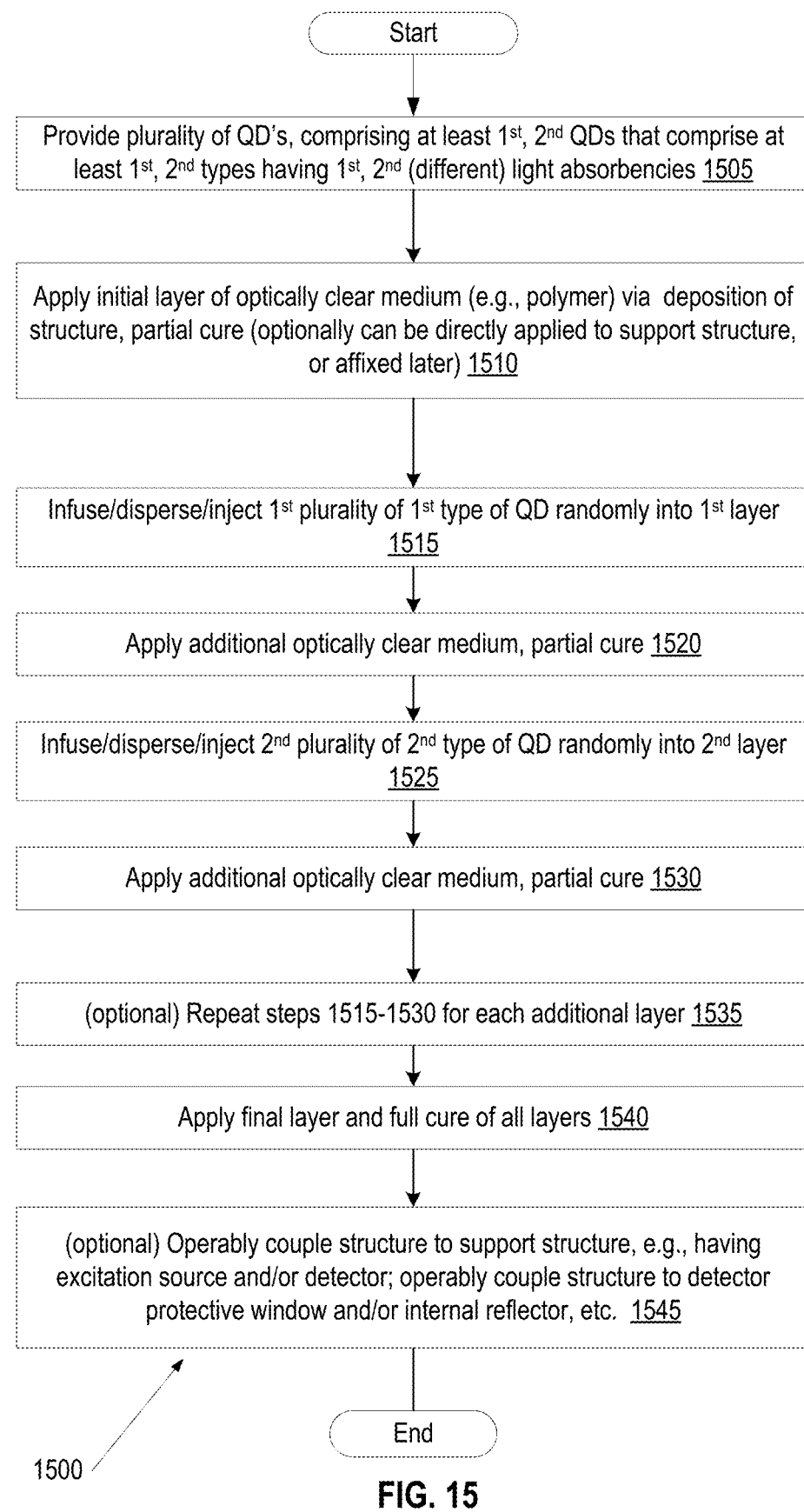
FIG. 15 is an example flowchart of a process for making a structure similar to that of FIGS. 2-14, in accordance with one embodiment.

In certain embodiments, the layers 202 are made of a material that can be partially cured or hardened as first portions of a first QDs of a first bandgap/color are injected or applied (this process is discussed further herein in connection with FIG. 15). Then a second layer 202b can be applied on top of the first layer 202a, the second layer 202b being injected with a second portion of randomly dispersed second QDs having a second bandgap/color different than the first bandgap/color. As noted above, in some embodiments, the delineation between any two layers, advantageously, is "blurry" vs being precise, so that a portion of the first QD and second QD will intermix along the boundary between layers, as shown in FIG. 3. For example, referring to FIG. 3, it can be seen along the boundary 220a, between layer 202b and layer 202a, that "green" QDs 206a, 206b, actually lie within layer 202a (which is primarily a layer of "blue" QDs 204, as indicated by the letter "B" in the respective dot), although most of the layer of "green" QDs 206 (as indicted by the letter "C" in the respective dot) are in layer 202b. Similarly, there is at least one blue dot 204b that has a location along the boundary 220a between layers 202b and 202a.

In the layered structure 110 of FIG. 3, each layer 202 has a randomly positioned portion of quantum dots (QDs) 204, 206, 208, 210 of varying band gaps, in accordance with one embodiment. Note that FIG. 5, discussed elsewhere herein, shows the same layered structure 110, but without showing the formal delineation or boundary of layers 202. In at least some embodiments, the boundaries between layers are not necessarily visible or distinct; rather, the boundary (e.g., boundary 220a of FIG. 3) is there to show that, in certain embodiments, there are essentially different subsections or transition areas in the overall layered structure 110, where the subsections or areas are each configured to have, predominantly, a certain respective type and color of QD that will predominantly be the same type of QD (same band gap/color. This "blurry" boundary, in certain embodiments, also helps to improve the uniqueness and security of the spectral pattern, especially because the random mixing of the varying QD dots in the transition zone/boundary, will be very hard to duplicate.

In addition, although the layers 202 are illustrated in FIGS. 3-4 as being substantially linear and horizontal, that is not intended to be limiting. As will be appreciated, the sections/layers 202 containing respective colors of plural dots, also could be vertical, diagonal, etc., and also could be arranged in further patterns (e.g., a single horizontal layer could be half one color QD, half the other), etc. The non-imaging near field CMOS detector configuration ensures a wide overlap zone via the avalanche effect of spectral/intensity weighted contributions well beyond the physical boundary for this embodiment configuration example. The sections/layers 202 also could have varying boundaries 220a that are effectively more like transition zones that can have any shape and need not be linear as depicted in FIGS. 3-4.

In the layered structure 110 of FIGS. 3-4, for layers 202a-202b, each layer 202 includes therein respective QDs (in FIG. 3 all the portions of QDs are shown as how they appear without the delineation of FIG. 3). For example, in FIGS. 3-4 there are blue QDs 204 (for layer 202a), green QDs 206 (for layer 202b), orange QDs 208 (for layer 202c), and red QDs 220 (for layer 202d). Thus, the layered structure 110 has layers with QDs of varying band gaps (i.e., various colors), in accordance with one embodiment, but the particular arrangement and colors are not limiting. In certain embodiments, this layered structure 110 can be formed on a support 120 (which for simplicity is shown only in FIG. 3), where the support 120 can correspond to any device, structure, or article of manufacture able to support the layers 202. In certain embodiments, the layers 202 and support 120 are further topped with a cover layer, such as internal reflector 124 (as shown in FIGS. 3 and 5, but, for clarity, not depicted in FIG. 4).

In some embodiments, the support 120 can be implemented using a substrate or a semiconductor integrated circuit, etc. In some embodiments, the support 120 corresponds to a side or portion of another subsystem, device or article of manufacture, such as an interior housing of a system, a heat dissipation device, an area of a circuit board, etc. Advantageously, the layered structure 110 is further configured on the support 120 so that its PUF feature is externally unrevealed. In certain embodiments, the support 120 has embedded or installed therein one or more excitation sources 112a, 112b, 112c, and a detector 114 (in some embodiments, the excitation source(s) 112 and/or the detector 114 can be separate from the support 120).

In certain embodiments, the excitation source 112 is a light emitting diode (LED), where the spectral output of the LED can be selected based on the particular application. In certain embodiments, the LED is configured to have short wavelength excitation light. Presently, LEDs are commercially available with single-element output power of about 5 mW, operating in a range of about 275 to 950 nm, and such LEDs can be tailored, for use as an excitation source 112 in at least some embodiments herein, based on the desired spectral pattern and QDs used in the structure. As is understood, the diverse spectral output afforded by LEDs makes it possible to select an individual diode light source to supply the optimum excitation wavelength band usable for exciting QDs, spanning the ultraviolet, visible, and near-infrared regions.

In certain embodiments, LEDs used for the excitation source(s) can be selected to substantially match the range of QDs in the layers, or can be selected to match certain QDs in certain layers, or can be selected to vary, so that certain LEDs can be configured for excitation at different types, enabling greater ease in cycling excitation source 112 on and off, as well as to rapidly select specific wavelengths via selection of particular LED excitation sources 112. This also increases the realm of possible challenges and responses and thus improves the security offered by the PUF 108. In certain embodiments, the LEDS can be part of an LED chip containing a plurality of LEDs. In certain embodiments, the LEDs are micro-light-emitting diodes (μ-LEDs). As will be appreciated by those of skill in the art, if an LED excitation source 112 is selected that is associated with a wavelength than longer than most and/or longer than that for the dots, then there may be a very low excitation efficiency and commensurate low emission signals. Thus, for the most advantageous embodiments, LEDs and QDs can be selected to meet a desired efficiency.

In certain embodiments, the location of the excitation sources 112 can be varied within the support 120, so that the different excitation sources 112 are configured to emit light at different angles, which further alters the patterns and colors of emitted light from the QDs. In addition, in some embodiments, the support 120 can be located in other places along the perimeter of the layered structure 110 and/or may have a different shape (e.g., an "L" shape, etc.) to enable the excitation source 112 to emit light from other places other than the "bottom" of layered structure 110 (e.g., see FIG. 14 herein, wherein excitation sources 112 are located along a side of the layered structure 110). In addition, because the excitation source(s) 112 and the detector 114 are fixed within the support structure (i.e., "built in" to the PUF 108), in certain embodiments, the variation in the pattern that can arise with arrangements such as that of FIG. 1, can be avoided, because the excitation source and the detector are in substantially fixed positions.

As will be appreciated, in some embodiments, the excitation sources 112 can be selectively controlled/configured to emit light or not emit light, in a predetermined pattern, which will lead to further variations in light emitted from the QDs that receive the light from the excitation source, where the variation in source and/or direction of excitation sources 112, helps to further ensure that the spectral pattern will be unique and very difficult to copy. In addition, in certain embodiments, different excitation sources 112 can be configured to emit at different wavelengths. The unique distribution and strategic layered ordering of the QDs, and the unique excitation results in a unique, directional spectral signature that arises from the pattern of QDs that produce light in response to the excitation (at specific wavelengths) by the excitation source 112. This pattern is captured by detector 114, which provides the information as a form of a unique optical transfer function, to the processor 102, which can then either directly compare or (optionally) perform additional processing, to enable a comparison of the unique optical transfer function to a stored value, to determine whether the PUF 108 matches.

Referring again to FIGS. 3 and 4, because the distribution and arrangement of QDs in the layers is unique, the emitted spectral pattern from those QDs, in response to light from excitation source(s) 112, also will be unique and also directional (as discussed further herein in connection with FIGS. 6A-14). By "directional" it is meant that the pattern viewed and detected by detector 114, from one direction or perspective will be different than the pattern or perspective if that detector 114 was located at a different perspective. In addition, because the QDs in different layers are configured to be QDs that emit light differently based on the wavelength of the excitation source of light, the resulting spectra will have varying spectral maps, both in color and in intensity, depending on which direction they are excited from, how much light from the excitation source can reach the layer, how much is attenuated, how much is able to be absorbed by the QDs, the wavelength of the excitation, and then what is able to be picked up by the detector 114.

Referring again to FIGS. 3 and 4, in accordance with various embodiments, the layered structure 110 is formed from multiple layers 202, and the layers are transparent to light, as noted above. The layered structure 110 can be formed with as few as two layers 202, e.g., first and second layers, so long as each layer has disposed therein a plurality of respective QDs that have band gaps different than that of the QDs in the other of the two layers, to help enable the unique patterns and/or combining of images (of different colors) in the resulting spectral map. In various embodiments, the layered structure 110 can also have more than four layers 202, as will be appreciated, so long as the entire structure 110 has least two different QDs of differing band gaps (to help produce a pattern having more than one color, in certain embodiment).

As is known, QDs are semiconductors that are not only tuned by their band gap, but also change their color based on their size (as defined above). In the exemplary embodiments of FIGS. 3 and 4 (as well as in FIGS. 5-14, discussed further herein), there are four different colored QDs represented, e.g.:

blue QDs 204, illustrated by circular dots containing the letter "B" (or having a particular pattern indicated by the "key," if applicable);

green QDs 206, illustrated by circular dots containing the letter "G" (or having the respective pattern as indicated in the key, if applicable);

orange QDs 208, illustrated by circular dots containing the letter "O" (or having the respective pattern as indicated in the key, if applicable); and red QDs 210, illustrated by circular dots containing the letter "R" (or having the respective pattern as indicated in the key, if applicable).

As is understood in the art, light (e.g., fluorescent light) that is emitted from the longer wavelength quantum dots (e.g., red, orange), may or may not be re-absorbed by the shorter wavelength quantum dots (green blue), depending on random orientation between layers. In addition, For simplicity all the dots in FIGS. 3,4 and 6A-14 are illustrated as having the same size, though in reality the actual sizes of QDs will differ based on color, as will be understood by those of skill in the art. For example, in some embodiments, QDs having a "larger" size (e.g., about 5-6 nanometers (nm) diameter) emit longer wavelengths and are associated with colors such as orange (e.g., QD 208a, 208b) or red (e.g., QD 210a, 210b). In contrast, "smaller" QDs (2-3 nm) emit shorter wavelengths, yielding colors like blue (e.g., Q D 204a) and green (e.g., green QD 206a, 205b). As will be appreciated, the specific colors may vary depending on the exact composition of the QD, and the colors shown in FIGS. 3 and 4 are illustrative and not limiting. Other layers 202 with different colors of QD and/or a different color order, are possible, as will be appreciated.

As shown in FIGS. 3 and 4 (and in other figures herein, as well), and as noted above, the distribution of QDs (e.g., blue QDs 204, green QDs 206, orange QDs 208, red QDs 210) is configured to be randomly placed within a layer, with the color of QD varying by layer, where the random distribution within each layer enables the boundary between colors/types of QDs to be somewhat indistinct or "blurry," at boundaries between layers, to enable some intentional, yet random, mixing of different bandgap QDs along the boundary. This random mixing helps to improve the uniqueness and security of the PUF 108. A specific manufacturing process is described further herein in connection with FIG. 19, to provide one way to accomplish this.

Referring again to FIGS. 3 and 4, for purposes of illustration, to differentiate the types of QD in FIGS. 3 and 4, rather than depicting colors or varying the size of the dot, as noted above, the drawings instead indicate via the letter shown within each QD (i.e., G B, G, O, or R), which type of QD it is, what color it emits, and what light wavelength(s) to which it is responsive. It also will be understood that the exact shape of any given QD will not necessarily be circular or spherical; rather, in the Figures herein, circular shaped QD dots are shown for purposes of illustration and not limitation. In addition, the order and arrangement of QD dot colors by layer 202 in FIGS. 3 and 4 (and elsewhere herein) is illustrative and not limiting. For example, in FIGS. 3 and 4, the layers 202 are depicted so that the longest wavelength layer (layer 202d), containing red QD dots 210, is positioned so that low frequency, longer wavelength light from an excitation source 112, is first passing through other layers first, before it reaches the layer 202d containing the longest wavelength QDs. However, this arrangement is not limiting.

In certain embodiments, the QDs used herein may be formed from any one or more of a variety of semiconductor materials and/or compounds, including but not limited to: CdSe (cadmium selenide), PbS (lead sulphide), InP (indium phosphide), CuInS2, (copper indium disulphide), Cu2ZnSnS4 (copper zinc tin sulfur, also known as CZTS), and CsPbBr3 (perovskite). In certain embodiments, the QDs can be formed using colloidal quantum dots.

In certain embodiments, at least some or all of the PUF 108 is contained within a housing or enclosure (not shown), and/or under a cover such as internal reflector 124, to further ensure that the PUF 108 is externally unrevealed, and, in particular, that the structure configured to generate the unique spectral pattern, is unrevealed and cannot be viewed without damaging the PUF so as to destroy or damage the unique arrangement and scattering of QDs in the layers 202. QDs can be a vast/different structure material size combination but compatible with solid solution/matrix implementation into the host without losing their quantum properties. Further, as noted previously, in certain embodiments, via use the PUF 108 is "externally unrevealed," this means that the PUF 108 cannot be interrogated from outside as doing that type of interrogation or challenge would result in an inaccurate (not matching, not authentic) signature, because the authentic signature can only be generated vie the internal, embedded excitation source(s) and picked up by the internal, embedded detector 114. Furthermore, attempting to excite from the inside, without using the precise structure of PUF 108 including the embedded detector 114 and excitation source 112, means disturbing the active layer—thereby destroying it (at least partially), which again results is an inaccurate/wrong signature.

Figure 6A:
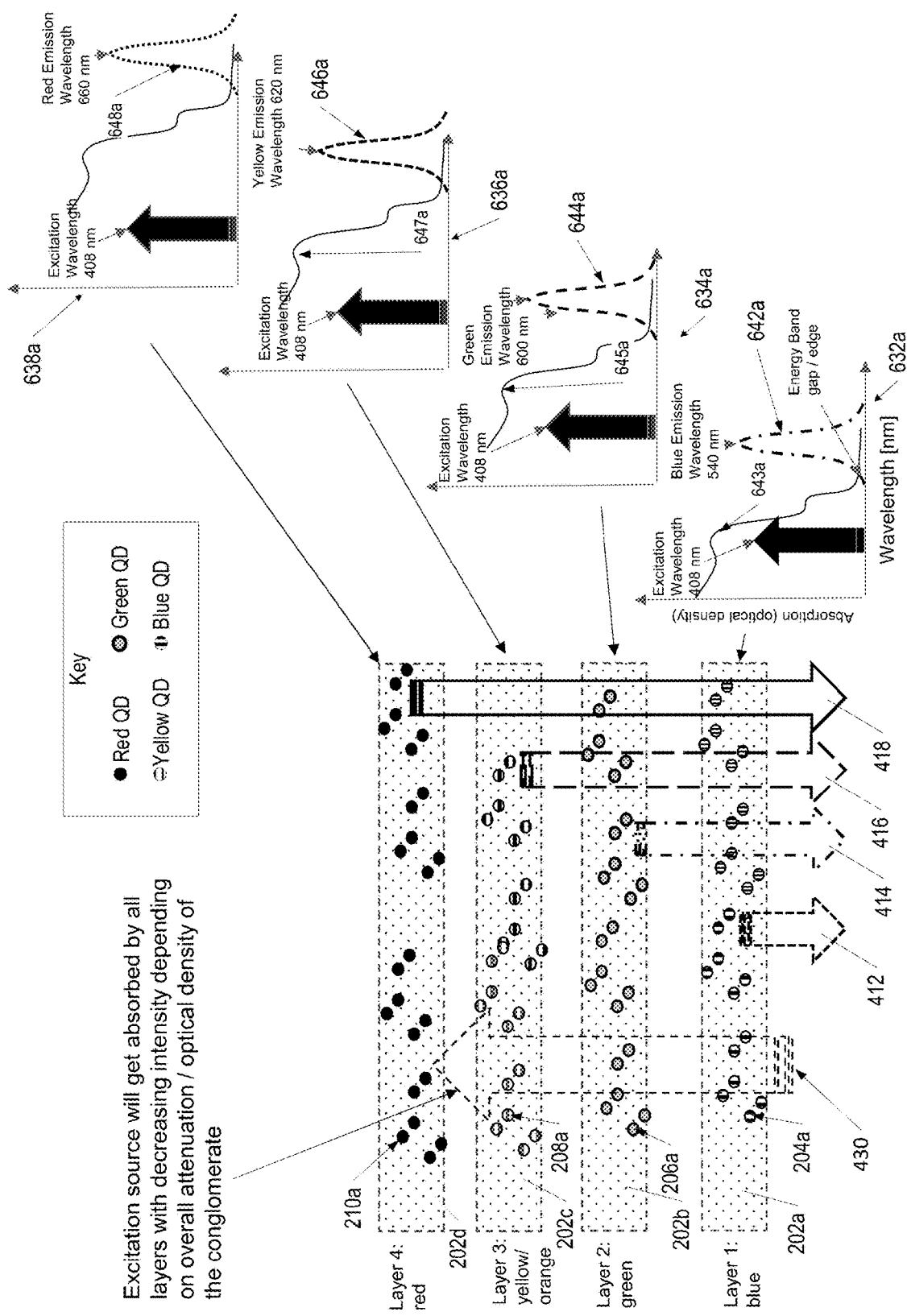
FIG. 6A is a first exemplary exploded cross section view and graphs for the structure of FIG. 3, including directions of excitation and emission and showing graphs of absorption vs. wavelength, showing how spectral signature varies with absorption of excitation source.
Figure 6B:
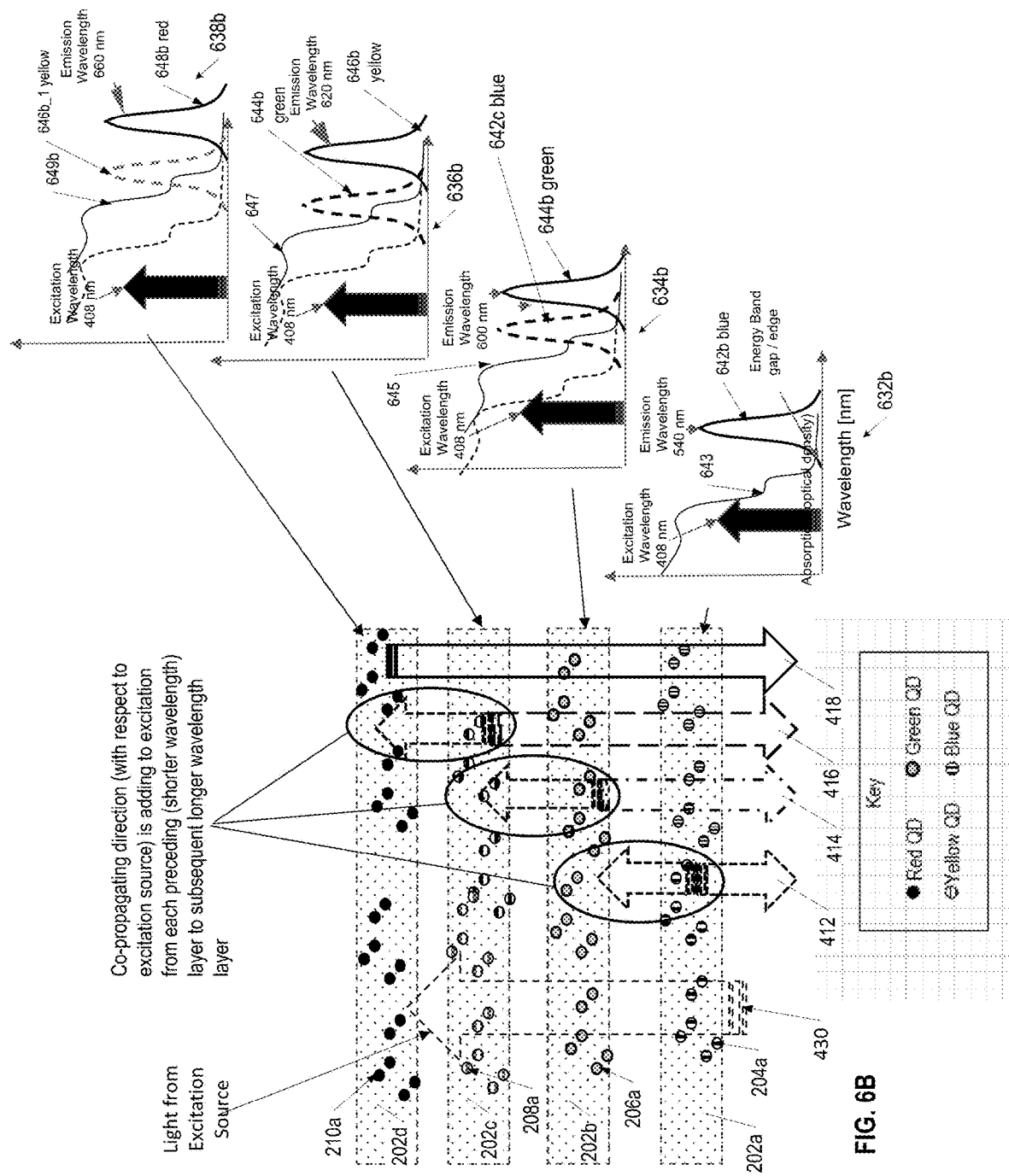
FIG. 6B is a second exemplary exploded cross section view and graphs for the structure of FIG. 3, including directions of excitation and emission and showing graphs of absorption vs. wavelength, showing how spectral signature varies with absorption of excitation source.

Reference is now made briefly both to FIG. 4 (which depicts the layers 202 in an exploded view, showing the colors of QD dots for each layer), and also to FIGS. 6A-6C, which are similar to FIG. 4, but not only shows an exemplary exploded cross section view of the layered structure 110 of FIG. 3 but also shows graphs for each layer the structure of FIG. 3, including directions of excitation and emission absorption vs. wavelength. FIG. 6A is a first exemplary exploded cross section view and set of graphs for the structure of FIG. 3, including directions of excitation and emission and showing graphs of absorption vs. wavelength, showing how spectral signature varies with absorption of excitation source. FIG. 6B is a second exemplary exploded cross section view and graphs for the structure of FIG. 3, including directions of excitation and emission and showing graphs of absorption vs. wavelength, showing how spectral signature varies with absorption of excitation source. FIG. 6A shows the graphs 632a-638a, for just what is seen at that layer, whereas FIG. 6B shows how the co-propagating light is added to the excitation from preceding layers.

The combination of FIGS. 4 and 6A-6B helps to show, in accordance with certain embodiments herein, how spectral signature varies with absorption of excitation source. In both FIGS. 4 and 6A-6B, the arrow for excitation source light 430 illustrates the direction of light from an excitation source 112 (not shown in FIG. 4 or 6A-6B, but shown, for example, in FIG. 3). The excitation source light 430 gets absorbed by all layers 202 with decreasing intensity, depending on the overall attenuation and optical density of the overall layered structure 110. This means that, for example, if excitation source light 430 is coming from the "bottom" of layered structure 110, the light will be stronger (less attenuated) the closer the light is to the excitation source 112 and will be less strong (more attenuated) at layers (e.g., layer 202d) that are further away from the excitation source 112.

Referring now to FIG. 6A, the exploded cross-sectional view of layers 202a, 202b, 202c, and 202d, is similar to that described previously for FIGS. 3 and 5. The excitation source light path 430 first "sees" the shortest wavelength (blue) QD layer 202a. The emissions from the blue QDs 204 will "escape" in the opposing direction (with respect to excitation beam 430) direction and is sensed by detector array 114, which for clarity is not shown in this view, but can be located at either the "bottom" of the PUF 108 (as shown in FIG. 3 and also in FIG. 9A, discussed further herein) or even at the "top" of the PUF 108 (as shown in FIG. 11, discussed further herein). The emissions that the detector 114 detects for the "blue" QD layer 202a, correspond to those directed by arrow 412 and are illustrated, for example, in graph 632a, which shows, for an excitation source 112 having a wavelength 408 nanometers (nm), a spectra for a blue emission wavelength having a peak at approximately 540 nm. The overall spectra for the PUF 108, at this point, is shown by the curve 643a in graph 632a.

The next layer the excitation source light path 430 sees emits at a longer wavelength (relative to blue) and is further away from the "blue" absorption edge, hence it will also "escape" in the opposite direction (e.g., the arrow 414), and will go through the first blue QD layer 202a, because that "blue" layer 202a will see no absorption at the longer wavelength. The next longer wavelength-responsive layer is "green" layer 202b, having green QDs 206. As shown in graph 634a, the green emission wavelength signal 644a, having a peak at approximately 600 nm, is able to "emit through" the preceding "blue" layer 202a in the opposing directions (shown by arrow 414). Thus, as shown in the graph 634a, the green emission wavelength signal 644a gets through and the overall spectra 645a still also includes the emission from the "blue" QD layer 202a.

Each subsequent layer that has progressively longer emission wavelengths (e.g., the yellow or orange layer 202c, and then the red layer 202d) will similarly emit through the preceding layers in the opposing (with respect to excitation) direction, as shown by arrows 416 (for the yellow/orange layer) and 418 (for the red layer). Thus, the graph 636a of FIG. 6A, for the yellow/orange layer shows that the spectra 646a for the yellow/orange emission similarly can get through the preceding layers, as can the red emission wavelength 648a, as shown in graph 638a.

In FIGS. 4 and 6B, the dual ended arrows (e.g., arrows 412, 414, 416, 418), illustrate, in two dimensions, the co-propagating (arrow end that is circled in FIG. 6B, which corresponds to the dotted end of the arrow in FIG. 4) and counter-propagating (arrow end that is not circled in FIG. 6B, which corresponds to the solid end of the arrow in FIG. 4) direction of light. That is, light in the co-propagating direction (with respect to excitation source) by the circled portions of the arrows 412, 414, 416) is adding to excitation from each preceding (shorter wavelength) layer to the subsequent longer wavelength layer. Thus, as seen in graph 634b (which shows the spectra at layer 202b), the blue emission spectra 642c (from preceding layer 202a) is added to the emission spectra from the green layer 202b (i.e., the emission labeled as 644b green). Similarly, for layer 202c (yellow/orange), the graph 636b shows the green emission 644b added to the orange/yellow emission 646b. And, finally, for red layer 202d, the yellow/orange emission spectra 646b_1 is added to the red emission spectra 648b of the red layer 202d.

Figure 13:
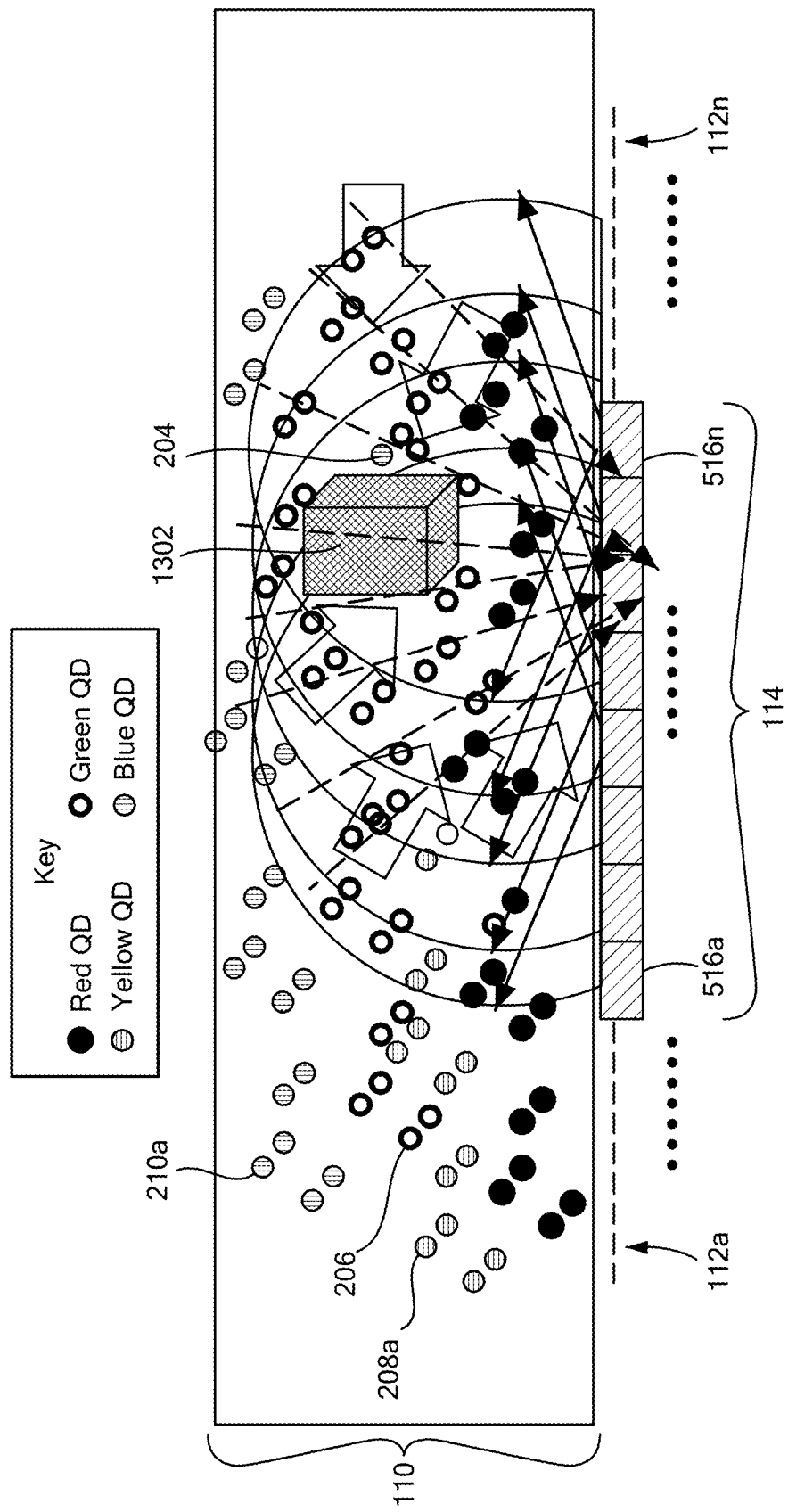
FIG. 13 is an exemplary illustration of a non-imaging detecting phenomenon associated with the structure of FIG. 3, in accordance with one embodiment.

Those of skill in the art will appreciate, however, that in certain embodiments, the co-propagating direction of light will travel in multiple directions (e.g., over an entire spherical volume, i.e., $2\pi$ steridians). Consider, briefly, FIG. 13, which is an exemplary illustration of a non-imaging detecting phenomenon associated with the structure of FIG. 2, in accordance with one embodiment. FIG. 13 shows the layered structure 110 of FIG. 3 in cross section, with a plurality of excitation sources 112a-112n and a plurality of detectors 516a-516n, as well as a layered structure that includes blue QDs 204, green QDs 206, orange QDs 208, and red QDs 210 (e.g., in accordance with the key). For the view of FIG. 13, in a non-imaging nearfield, each pixel of the detector 114 will see "rays" over $2\pi$ steradians—contribution from "everywhere" (meaning all pixels that are emitting), weighted in signal intensity based on relative displacement of an emitting volume element (i.e., a QD) from a pixel position of the detector 114. Removing volume element 1302 of certain dimension results in equivalent effective change that is much larger than physical size for the detector 114 because of the avalanche based spectral/intensity weighted contributions from a large solid angle field of view subtend afforded by the non-imaging detector array configuration.

Referring again to the simplified two-dimensional representation of FIGS. 4 and 6A, the arrow 412 corresponds to "blue" light emissions, arrow 414 corresponds to "green" light emissions, arrow 416 corresponds to "orange" light emissions, and arrow 418 corresponds to "red" light emissions. Referring particularly to FIG. 6B, it can be seen that for three of the dual ended arrows 412, 414, 416, each respective arrow has one half shown solid (the half pointing to the "bottom" of the layered structure 110) and the other half shown with dotted lines (and circled with a respective oval 620, 622, 626) and pointing to the "top" of layered structure 110. The solid line portion shows directly emitted light from the QDs (after excitation source 112 directly impinges on them, in the direction of arrow for excitation source light 430). The dotted line portions of the respective blue arrow 412, green arrow 414, and orange arrow 416, each show the respective direction of co-propagated light (light that is being directed in other directions within the layered structure 110, which will undergo multiple reflections and scattering within the layered structure 110), with respect to the excitation source 112. In particular, as shown in FIG. 6B (and as discussed above in connection with the graphs on in FIGS. 6A and 6B), the co-propagated light portions indicated by ovals 620, 622, 626 add to the excitation from each preceding (shorter wavelength) layer to each subsequent longer wavelength layer.

As an example, in the example embodiment of FIG. 6A-6B, assume, in graphs 632-640, an excitation source 112 provides light at exemplary excitation wavelength of 408 nm, corresponding to an excitation LED in the "blue" light range and a "higher" frequency (e.g., 735 terahertz (THz)). Each graph 632-638 shows the additional contribution to the overall spectra (viewed at detector 114, which would be at the "bottom" of the layered structure 110 as per FIG. 3), as added at each layer 202, by that layer 202, and helps to show how the co-propagating emission (shown as the "dotted" end of the arrow) is added to the emission from each preceding layer. The dotted fluorescence/emission propagation directions co-propagating with the excitation source direction (upwards) will see significantly higher attenuation/absorption as compared to the downward propagating solid arrows since in this counter—propagating direction (with respect to excitation source), each longer emission wavelength band will see minimal absorption though the preceding (closer to the bottom) QD layers. This is enabled by sequentially adding top layers with QDs of incrementally longer emission bandgap wavelengths. As will be understood, absorbed light sees attenuation as it propagates all the way through the composite layer structure 110, as does emitted light, and the varying attenuation depends on which direction the absorbed/emitted light travels, driven by optical density, signal strength, etc. In addition, it will be understood that the illustrations in FIG. 6 help to illustrate the directionality of the absorbed and/or emitted light.

If the excitation source light 430 is at 408 nm, in the exemplary embodiment of FIG. 6B, the first emitted light 642a arises from the "blue" QDs 204 in first layer 202a and has an emission wavelength of 540 nm within layer 202a, as shown in graph 632b, which is a graph of wavelength (x-axis) vs absorption (optical density) (y-axis). The graph 632b of FIG. 6B represents just what is happening and visible within the first layer 202a, when the excitation source light 430 hits that layer 202a, to produce first emitted light spectra 642a. That is, if the layered structure 110 were viewed just from the perspective of layer 202a, from a detector 114 located at the "bottom" (as in FIG. 3), the graph 632 shows that what would be visible as spectra is both the excitation wavelength spectra signal 643 (at about 408 nm) and the first emission 642a from the blue QDs, at about 540 nm. Thus, in graph 632b, the absorption spectra vs wavelength of the graph 632 is just for the "blue" layer 202a.

Similarly, the graph 636b shows what is visible at layer 202b, looking back to the same detector 114 located at the "bottom" of the layered structure 110 if the layered structure 110 were viewed from that perspective, with both the second emitted light spectra 644a from the second to the bottom layer (layer 202b), at an emission wavelength of 600 nm, being part of the spectra, as well as the first emitted light (shown by solid line 642) from the QD dots of the blue layer 202a. The graph 636b shows that the first emitted light 642c blue (at 540 nm) is a dotted line, to indicate that it is in the spectra as a result of being co-propagated light, and the second emitted light spectra 644a, is at 600 nm, from the "green" QDs 206a, of layer 202b, and appears as a solid line 644b. The graph 634b thus shows that the spectra from the blue QDs 204 and the green QDs 306 are both visible when viewed from the bottom of layered structure 110, towards second layer 202b.

The curves depicting the bandgap edge of each of the QDs depicted in this example are depicted as 643 (for blue), 645 (for green), 647 (for yellow) and 649 (for red). The bandgap edges shown by these curves move progressively towards the longer wavelength as the QD bandgap progressively increases in wavelength (decrease in frequency) going from red—yellow—green and blue, respectively. The graph 634 shows that the excitation at 408 nm will see absorption for all 4 bandgaps corresponding to the four notional colors used in this example ensuring all 4 different bandgap QDs will be excited (shown as spectral signal 645 of graph 634). Each more adjacent to the bottom layer will generate strong counterpropagating emission (solid arrows) with the co-propagating signal (dotted arrows) seeing significant attenuation in the subsequent longer wavelength band gap layer, etc.

Continuing through the layers shown in FIG. 6B, the graph 646 shows the spectra seen at the third layer from the bottom (layer 202c). The signal labeled as 646b corresponds to the emission from the yellow/orange QDs 208 in the third layer and has an emission wavelength of 620 nm. The co-propagating emission from the green QDs 206 in layer 202b is shown as the dotted signal 644, still at 600 nm. However, the co-propagating emissions from the blue QDs 204 (i.e., emissions at 540 nm) of the first layer 202a, is now part of the combined signal 647b. Thus, if a detector 114 were looking only at the spectra at the layer 202c, from the perspective of the layer 202c, the only visible spectra would be the green co-propagating emission 644b at 600 nm and the orange emission 646b; the blue emission is no longer. When the signal is combined, blue excitation from the blue QDs of layer 202a, which was a solid line 642 in graph 632 and was a dotted line 642b in graph 634, is now, in graph 636.

Figure 7:
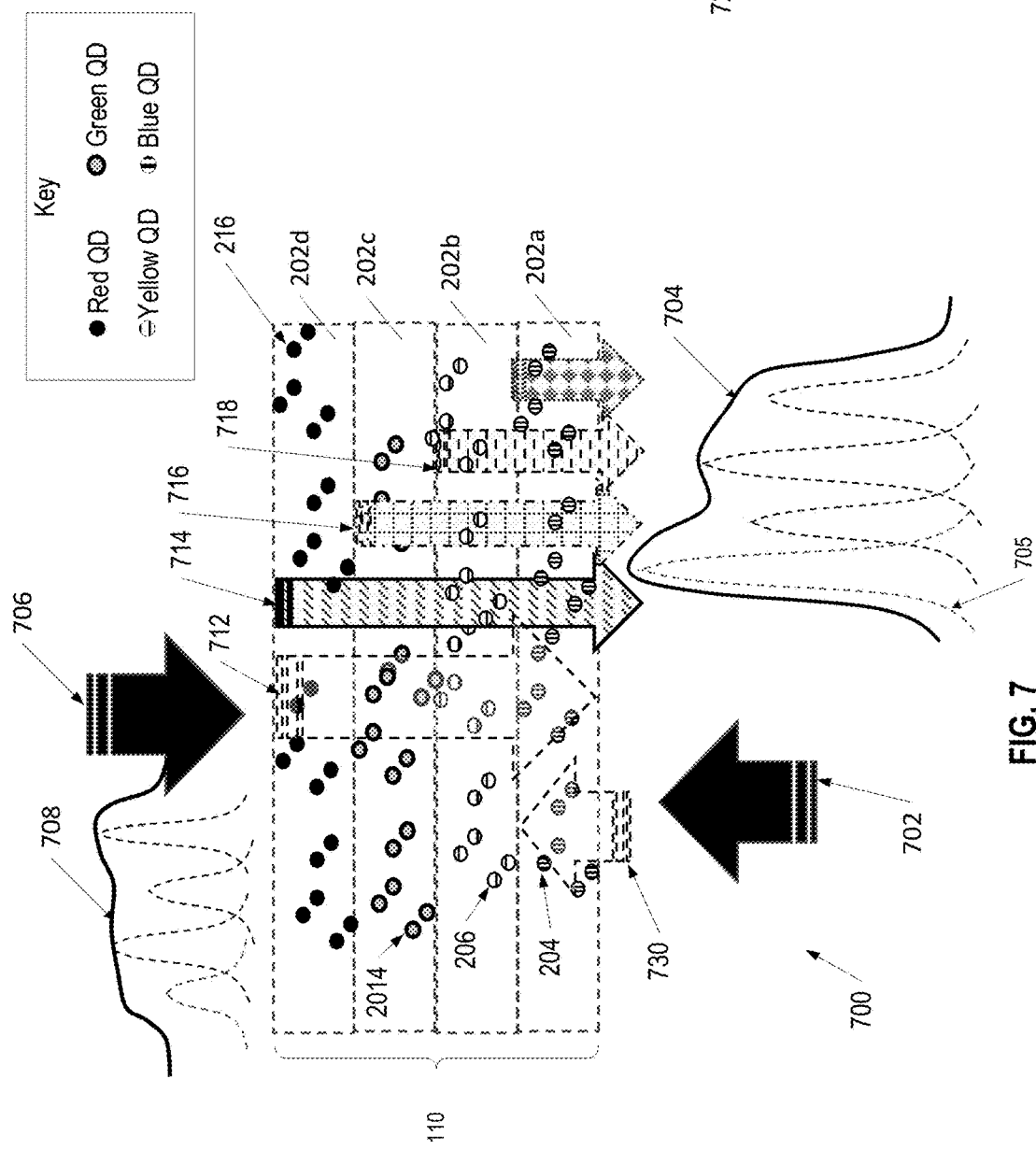
FIG. 7 is an exemplary cross section view of the structure of FIG. 3, including graphs demonstrating how the spectral signature is directionally unique.

FIG. 7 is another exemplary cross section view of the layered structure 110 of FIG. 3, including additional graphs demonstrating how the spectral signature is directionally unique. In viewing the "top" of the layered structure 110, top excitation 706 "punches" through to last "blue" layer 204 having QDs with a "blue" bandgap. The longest wavelength (red) layer 202d and subsequent longer wavelength layers (layer 202c with orange QDs, then layer 202b with green QDs) have emissions that also pass through unobstructed to the lowest layer 202a, where they will be picked up by a detector 114 (not shown) disposed near the bottom of the layered structure 110. The graph with the curve labeled as 708, in FIG. 7, shows the relative intensities of each color QD and that emissions from each QD layer are visible to a detector 114 at the bottom.

However, in FIG. 7, the "bottom" excitation 702 produces a different spectral result. Attempting to excite and detect fluorescence spectra of the QDs, in the opposite, way results in most of excitation 702 being absorbed by the shortest wavelength QD layer (e.g., the blue QD layer 202a). Consequently, other longer wavelength emissions (e.g., those with longer wavelengths than blue, such as green, yellow/orange, and red), would see commensurately significantly higher attenuation, and thus be less visible in the output spectra. This is shown in the curve 704, which shows that the fluorescence spectra of the blue QD layer 202a (the leftmost sub signal in the graph containing curve 704, which leftmost sub signal is labeled as 705) dominates the spectral intensity graph. This, the resultant spectral intensity distribution is vastly different in the curve 704 vs 708, demonstrating that the spectral signature is directionally unique. In addition, a comparison of the curve 708 in FIG. 7 with the curve 704 in FIG. 7, helps to convey the spectrally lopsided difference of the resultant cumulative emission spectra signal in the two opposing directions.

Figure 8:
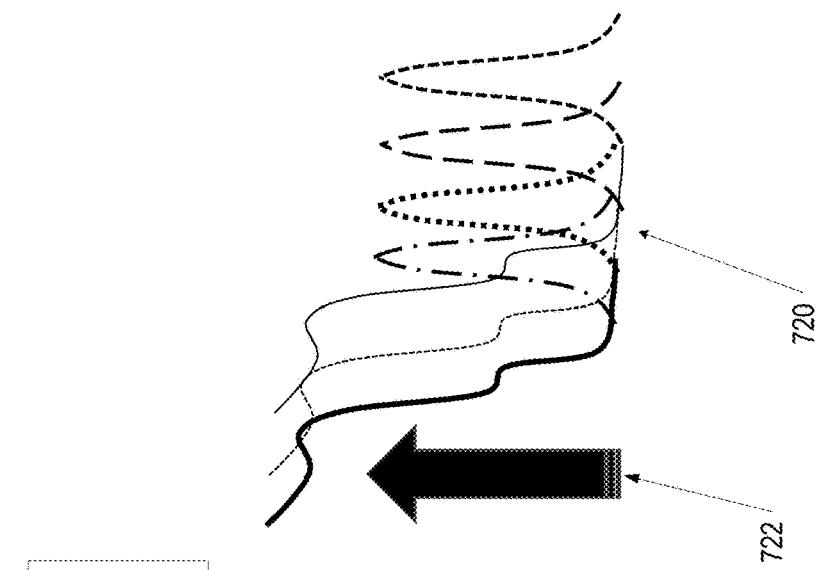
FIG. 8 is a graph showing a spectral signature of the structure of FIG. 3 if it were altered to have its longest wavelength layer at an innermost layer position, in accordance with one embodiment.

As a further variation, FIG. 8 is a graph 720 showing a spectral signature of the structure of FIG. 3 if it were altered to have its longest wavelength layer at an innermost layer position, in accordance with one embodiment. The graph 720 of FIG. 8 shows an emission spectrum for an embodiment where the longest wavelength layer is at an innermost layer position, with a direction of impinging light, from an excitation source, shown via arrow 722. This graph 720 shows that emissions for all layers are visible in the spectral signal profile.

To further illustrate the directionality of the spectral image, reference is now made to FIGS. 9A-12, which show several configurations of the layered structure 110, detector 114, and excitation sources 112.

FIG. 9A is a first perspective exploded view of an embodiment of the PUF 108 of FIG. 2, with both detector 114 on the bottom and excitation sources 112 on the bottom, and internal reflector 124, on top, showing excitation from a first direction and co-propagating directions of emissions from QDs, in accordance with one embodiment. The embodiment of FIG. 9A is similar to that of FIGS. 3 and 5, discussed above. The arrows 802-810 show directions of light from excitation sources 112a-112e which direct light, in this example, in the direction shown by excitation source arrow 430b, through the layered structure 110. Arrow 850 shows generally a direction of light "reflected" off reflector 124. In addition, as noted previously in connection with FIG. 6B (but for clarity not depicted here), there will be light from the illuminated QDs in both a co-propagated and counter-propagated direction.

FIG. 9B is a portion of a first exemplary spectral readout pattern from the arrangement of FIG. 9A, as viewed from the detector 114 at the "bottom" of the layered structure 110 (e.g., as shown as part of support 120), where the exemplary spectral pattern 1000c (which is illustrative and not limiting, shows, for example, a first "rainbow" pattern of emission spectra in pattern, where this spectra is associated with the co-propagating light pattern of FIG. 9A. For example, the light path 802 may, for example, produce a portion of the spectral pattern within the overall pattern 100c, such as the column corresponding to red spectra 810b, orange spectra 808a, and green spectra 806a. This is of course, merely exemplary.

FIG. 10A is a second perspective exploded view 900 of an embodiment of a PUF 108, with a detector 114 on the bottom and excitation sources 112a-112e on the top, showing excitation from a first direction and co-propagating directions of emissions from QDs, in accordance with one embodiment. FIG. 10A illustrates first excitation source light 430a from a first direction from the top of the layered structure 110 down, and co-propagating directions of emission (shown by the dotted line arrow paths 902, 904, 906, 908, 910) pointing towards the "bottom" layer 202a). In FIG. 10A, the co-propagated emissions of light 902, 904, 906, 908, 910, and any light emitted by QDs that are impinged upon by first excitation source light 430a, are detected by detector 114 which is located on the "bottom" of the structure. That is, the structure of FIG. 10A differs from the embodiment of FIG. 3, because in FIG. 10, the detector 114 on bottom and excitation source(s) 112a-112e on top, whereas with FIG. 3, both detector 114 and excitation source(s) 112, were on the bottom.

FIG. 10B is a portion of an exemplary second spectral readout 1000a from the arrangement of FIG. 10A, as viewed from the detector 114 at the "bottom" of the layered structure 110 (detector on bottom), in the form of a readout from the detector, where the spectral readout 1000a has a first column of readout pixels 1010a, a second column 1012a, a third column 1014a, a fourth column 1016a, and a fifth column 1018a. Assume in this embodiment, that the first column of readout pixels 1010a corresponds the detector 114 picking up emissions arising from excitation 430a and co-propagated light indicated by dotted line arrow path 902. As FIG. shows, the co-propagated light in dotted line arrow path 902 passes through a red QD dot, an orange QD dot, a green QD dot, and a blue QD dot. Because the excitation 430a, in this example, is high frequency LED light (e.g., about 408 nm wavelength), this high frequency emission is able to cause all of these types of QD dots to emit. That is, this corresponding spectral pattern detected by first column of readout pixels 1010a includes corresponding red, orange, green, and blue pixels, because all corresponding QD dots impinged upon by the light path 902, are able to emit after being stimulated by the high frequency first excitation source light 430a. Thus, the red QD dot in path 902 emits red light that will still be seen at detector 114, even though it is "behind" the other QD dots along the path 902. Further, if the detector 114 is viewing emitted light from the "bottom" of the layered structure 110, as in FIG. 10A, all of the colors (blue, green, orange, red) can be visible in the spectrum shown in the first column of readout pixels 1010a, because blue QD dots will not absorb light from lower frequency, longer wavelength dots like green, orange and red dots. Thus, those other colors, along with blue will be "visible" to the detector 114, if the detector is at the "bottom" of layered structure 110, even if the intensity may be less strong for QDs more distant from the detector 114.

Similarly, the second column 1012a on the spectral readout 1000a corresponds to the light path 904, which is shown as passing through an orange QD dot and a green QD dot, in that order. Similarly, the third column 1014a on the spectral readout 1000a corresponds to the light path 906, which is passing through a red QD dot, orange QD dot, blue QD dot, and green QD dot, in that order, and the spectral readout 1000a matches that. Likewise, the fourth column 1016a, corresponds to light path 908, which passes through a green QD dot and blue QD dot, etc.

FIG. 11 is a second perspective exploded view 1100 of another embodiment of a PUF 108, with a detector 114 on the top and excitation sources 112a-112e on the bottom, showing second excitation 430b from a first direction and co-propagating directions of emissions from QDs (via paths of light 1102, 2204, 2206, 1108, 1110), in accordance with one embodiment. FIG. 11 illustrates second excitation 430b from a second direction from the bottom of the layered structure 110 up, and co-propagating directions of emission (shown by the dotted line arrows for paths of light 1102, 1104, 1106, 1108, 1110) pointing towards the "top" layer 202d). In FIG. 11, the co-propagated emissions of paths of light 1102, 1104, 1106, 1108, 1110, and any light emitted by QDS that are impinged upon by second excitation 430b, are detected by detector 114 which is located on the "top" of the structure. That is, the structure of FIG. 11 differs from that of FIG. 3 because it has detector 114 on top and excitation source(s) 112a-112e on bottom.

FIG. 12 is an exemplary spectral readout 1000b from the arrangement of FIG. 11, as viewed from a detector 114 at the "top" of the structure (detector on top, in the form of a readout from the detector 114, where the spectral readout 1000b shows a pattern that depicts the pattern of readout pixels that correspond to the light that gets through to the detector 114, with the arrangement of FIG. 11. It can be seen that the spectral readout 1000b is very different than that of 1000a, for the same structure (just like the spectral readout 1000c differs from both that of 1000a and that of 1000b). For example, for the path of light 1102, directed towards detector 114, in FIG. 11, it can be seen that the path of light 1102 flows from layer 202a, through a blue QD dot, then a green QD dot in layer 202b, then an orange QD dot in layer 202c, and then a red QD dot in the transition zone between layer 202c and 202d. However, in the corresponding column containing red pixel 1010b of FIG. 12, the only spectral image that is visible is the red pixel 1010b, because the light from the blue, green, and orange QD dots, in the path of light 1102, are absorbed into the red QD dot, which is at a longer wavelength and lower frequency. Thus, the only QD dot illumination visible in the spectral image is the red pixel 1010b.

FIG. 14 is a second exemplary cross-section view 1400 of another embodiment of the PUF 108 FIG. 2, showing the PUF 108 implemented via at least partially embedding a three dimensional structure 1402 (e.g., which can be a device, such as an electronic device, or any other object) within a dispersion medium 1406 (e.g. a heterogeneous dispersion medium) that also has QDs embedded therein, in accordance with one embodiment. The QDs 1408 (shown as the small circular dots 1408 in FIG. 14) are configured to comprise a plurality of various band-gap types and can be excited via one or more excitation sources 112. A structure 1402, such as a semiconductor chip, integrated circuit, etc., has coupled to it a detector 114, such as a complementary metal oxide semiconductor (CMOS) sensor array. The QDs 1408 are disposed within a heterogeneous QD dispersion medium, which can be any optically clear type of material similar to that described for use on layers 202, as described elsewhere herein.

In the device of FIG. 14, when the excitation sources 112 emit light, such as the short wavelength excitation light shown in FIG. 14, the light impinging on the QDs 1408 causes each QD to emit a colored light, in the same manner as discussed previously. The detector 114 picks up the colored light and converts it to an appropriate optical transfer function. Because the embodiment of FIG. 14 is entirely embedded within the heterogeneous QD dispersion medium 1406, the spectral pattern of the PUF 108 is not revealed. In addition, as noted previously, even QDs 1408 that are distant from the excitation source 112 and/or the detector 115, have emissions that can impact each other, where the emissions can also reach the detector even going around corners, e.g., of three-dimensional structure 1402.

In both the embodiment of FIG. 14 as well as the previously described embodiments of FIGS. 2-13, the detector 114 and excitation sources 112 are configured so that they are in operable communication with one or more external controls and/or external systems that are configured to provide challenges/controls to operate the excitation sources 112 and to provide a way to receive or interpret a response from the detector 114. For example, in some embodiments, there may be wiring (not shown) or other connections to the detector 114 and/or the excitation sources 112. In embodiments such as those of FIGS. 3-13, where the PUF 108 can be implemented with a support 120, the connections to the external controls and/or communications to receive sensor data, can be implemented using the support 120, such as by wiring traces on that support structure, by one or more conductive via holes in the support 120 permitting electrical connections, etc. electrical connections In some embodiments, the view of the embodiment FIG. 14 represents a "top down" cross-sectional view, wherein the detector 114, excitation sources 112, and the device 1402 (e.g., an integrated circuit) are all directly or indirectly coupled to a circuit board or test fixture with the dispersion medium 1406 configured to encapsulate or coat the device 1402, detector 114, and excitation sources 112, while still permitting operable connections to the detector 114 and excitation source 112, as will be understood in the art.

FIG. 15 is an example flowchart of a process 1500 for making a layered structure 110 similar to that of FIGS. 2-14, in accordance with one embodiment. A plurality of QDs is provided, comprising at least 1st, 2nd QDs that comprise at least 1st, 2nd types having 1st, 2nd (different) light absorbencies (block 1805). An initial layer (which can be a film) of optically clear medium (e.g., a polymer) is formed, such via deposition of structure, spin casting, drop casting, injection, etc., onto a surface and this structure is partially cured (block 1510), in accordance with any cure method applicable to the optically clear medium. Optionally, in certain embodiments, this layer can be directly applied to a support structure (e.g., support 120 as discussed herein). In certain embodiments, the structure formed via the process of FIG. 15 is secured or affixed later to a support structure. In certain embodiments, the structure formed in the process of FIG. 15 is configured to be formed on or around a device, such as an integrated circuit, where the resulting combined structure can later be coupled (including removably coupled) to a circuit board or test fixture.

In block 1515, a first plurality of a first type of QD are inserted randomly into the first layer. There are many known ways to apply QDs to and into mediums, including but not limited to a lithography process, a printing process, a three-dimensional (3-D) printing process, an injection process, a polymerization process, an extrusion process, a solution-case process, etc., injection, and many uncontrolled processes which are configured to disperse QDs randomly, are usable in accordance with embodiments herein. In block 1520, after the initial first plurality of first type of QDs are randomly applied to the initial layer, additional optically clear medium is applied and partially cured. At this point, if an exemplary structure such as that of FIG. 3 were considered, this would have applied first layer 202a and the blue QDs 204, randomly dispersed. By doing a partial cure, that step enables the QDS from the next layer to intermix with those of the previous layer. As will be appreciated, partial curing advantageously ensures that each subsequent layer that is added will have different bandgap QDs; accordingly, with each subsequent sequential "partial curing, the process ensures that the result will be a quasi-heterogenous layering of different bandgap QDs. If, instead, all the QDs were intermixed, the resulting structure would not have a layer preferential resultant matrix architecture.

After partial cure of the additional (e.g., second) layer of optically clear medium is complete (block 1520), a second plurality of QDs are applied, in a random orientation, to be dispersed within the second layer (block 1525). Because the layer applied in block 1520 was only partially cured, intermixing between the first type of QD (e.g., blue QD 204 as in FIG. 3) and second type of QD (e.g., green QD 206 as in FIG. 3) is possible. In block 1530, additional optically clear medium is applied. If the layered structure 110 is to be complete, the method moves to block 1540 for applying final layer and/or a cover, and final cure. However, if additional layers are to be applied, steps 1515-1530 are repeated for each layer (block 1535). Advantageously, the additional layers, in certain embodiments, are additional different types of QDs (e.g., as shown in and described herein in connection with FIG. 3 (e.g., orange QDs and red QDs). In certain embodiments, the layers can be constructed and arranged so that they progress from shorter wavelength colors to longer wavelength colors, as shown with FIG. 3.

When all of the layers of the structure are complete and fully cured (block 1540), the resulting structure can be coupled to a support structure, the detector protective window 122, the internal reflector 124, a component, a circuit board, etc., including, in some embodiments, a support 120 as shown in FIG. 3 (block 1545). In some embodiments, as noted previously, the entire layered structure 110 is formed directly onto the support starting at block 18110. In some embodiments, the processes of blocks 1805-1840 can be applied directly around a semiconductor device, e.g., as shown in FIG. 14. In some embodiments, as noted above, the entire layered structure 110, as well as detector 114 and excitation sources 112, are formed onto a three-dimensional object, device, or system, e.g., as a coating or film.

Figure 16:
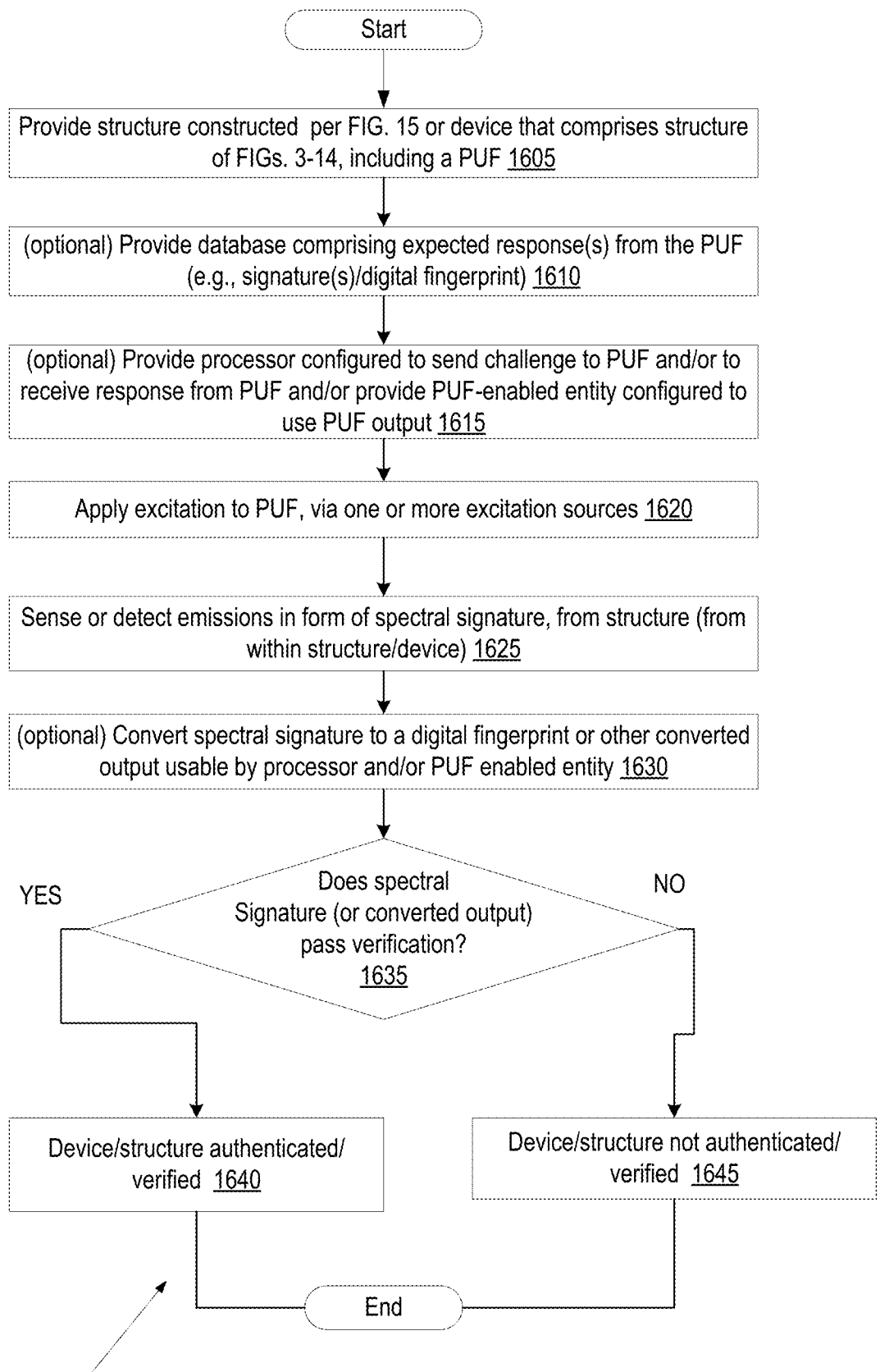
FIG. 16 is an example flowchart of a process for using a structure similar to that of FIGS. 2-14, for authentication, in accordance with one embodiment.

FIG. 16 is an example flowchart 1600 of a process for using a structure similar to that of FIGS. 2-14, for authentication and/or verification, in accordance with one embodiment. The structure will embody a PUF 108 as discussed herein. In block 1605 a structure, e.g., as shown in FIGS. 3-14 and/or constructed in accordance with FIG. 15, is provided. Optionally (e.g., if the PUF is part of a challengeable configuration), a database containing expected responses from the PUF 108, such as an expected signature, or digital fingerprint is provided (block 1610). In block 1615, optionally (e.g., if the PUF is part of a challengeable configuration) a processor is provided (e.g., as shown and described in FIG. 2), where the processor is configured for sending a challenge to the PUF 108 and for receiving a response from the PUF 108. Alternately, or in addition to the processor, in block 1615, in certain embodiments, a PUF-enabled entity is provided, where the PUF-enabled entity is configured to use the PUF output as part of its operation. For example, in certain embodiments, a PUF-enabled entity may be configured to use the PUF output as an access token or key to access certain functions or features, whether on the PUF-enabled entity itself or in other devices or system. A PUF-enabled entity may be configured to use the PUF output as an encryption key (or as a seed for an encryption key) for communication with other entities. Those of skill in the art will appreciate that PUF outputs may have many applications, especially as part of verification, and these examples are illustrative and not limiting. In block 1620, an excitation is applied to the PUF 108, via one or more excitation sources. Because the excitation sources, in certain embodiments, are embedded into the PUF, the excitation is consistently applied from a fixed, stable, and/or predetermined angle and location, helping to ensure a consistent PUF response for comparisons.

In block 1625, a spectral signature is received, the spectral signature, consisting of emissions from the two or more layers containing two or more different band-gap QDs. In certain embodiments, the spectral signature is received from a detector 114 or sensor, such as a CMOS detector, which is embedded within the PUF 108 and/or coupled to the PUF 108. In block 1630, the spectral signature optionally, in certain embodiments, is converted to a digital fingerprint or other representation, if necessary for use in block 1635. In certain embodiments (e.g., challenge-response environments), the spectral signature is converted to a form where it can be part of a comparison to the expected response from that PUF in the database of expected responses. In certain embodiments, the conversion of block 1630 involves turning the spectral signature into a representation that is usable by another system.

In block 1635, a check is made to see if the spectral signature response from the PUF passes a verification operation, by determining if the spectral signature response from the PUF satisfies one or more predetermined conditions. The one or more predetermined conditions can vary, in certain embodiments, depending on the environment in which the PUF is operating. For example, in certain embodiments where the PUF is used in a challenge-response environment, the predetermined condition involves determining whether the spectral signature (whether by itself or converted into a desired representation) matches what is expected from that PUF (e.g., does a digital signature from the PUF match a corresponding signature stored in the database). In embodiments where the PUF is providing output to a PUF enabled entity, the predetermined condition involves checking the spectral signature (whether by itself or converted into a desired representation) to see if the PUF signature is usable by the PUF enabled entity. For example, in some embodiments, the "passing" verification at block 1635 means that the PUF enabled entity is able to use the PUF output as an access code to access another entity (where an entity can be a device, system, function, application, or even a physical entity such as a secure facility or location). In some embodiments, the "passing" verification at block 1635 means that a PUF output exists at all (e.g., where non-authentic subsystems or structures may not even have a PUF included in it as all). If the answer is YES at block 1635, then the device or structure containing the PUF is authenticated or verified. If the answer is NO, then the device or structure containing the PUF is not authenticated or verified.

The above described embodiments have provided a PUF that incorporates layers of quantum dots (QDs), one or more built-in excitation sources for stimulating the PUFs, and a built-in sensor for detecting emissions from the quantum dots, where the entire operation is configured and constructed to be externally unrevealed. In certain embodiments, PUFs produced in accordance with the descriptions above provide ultra-high and increased entropy, and, hence, uniqueness, over known structures. In certain embodiments, the PUFs produced in accordance with the above descriptions enable a non-reversible spectral signature. In certain embodiments, PUFs can be created that provide one or more of the following advantageous features:

interrogation direction and angle specific spectral intensity fingerprint generation;

unique non-externally observable spectral signature enabled by asymmetric optical transfer function;

physical random distribution/entropy increase which can be >~100 fold as compared to current state of the art autonomous architectures;

extremely low SWaP/footprint of excitation source, sensing volume, and sensor for truly self-contained robust deployment to chip level scale geometries;

intractable to observe and falsify in useful timelines; and robust and inexpensive to implement based on common high technology readiness level (TRL) components.

Figure 17:
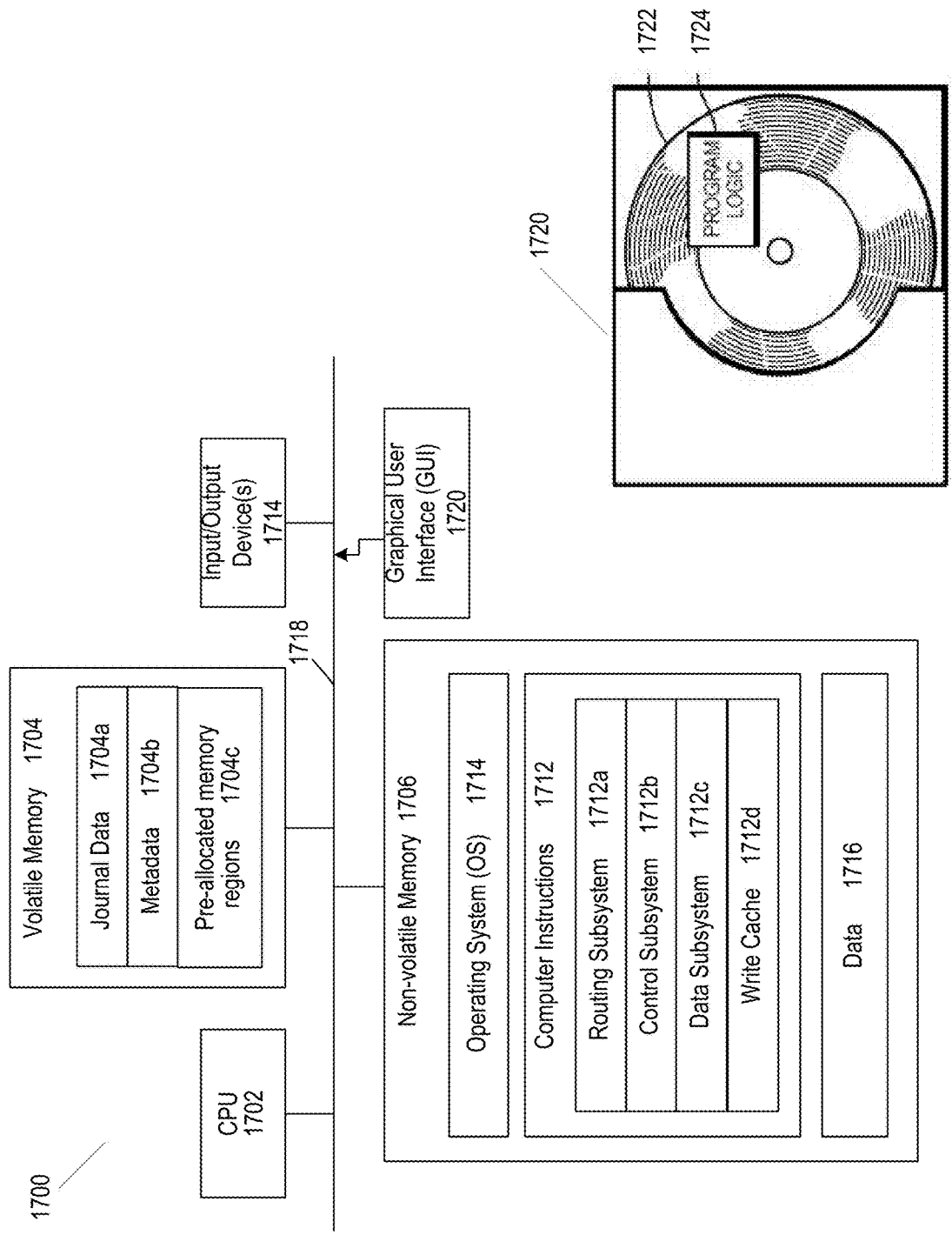
FIG. 17 is an exemplary block diagram of a computer system usable for implementing at least some of the processes of FIGS. 2-16, in accordance with one embodiment.

FIG. 17 is a block diagram of an exemplary computer system 1700 usable with at least some of the systems and apparatuses of FIGS. 1-16, in accordance with one embodiment. Reference is made briefly to FIG. 17, which shows a block diagram of a computer system 1700 usable with at least some embodiments. The computer system 1700 also can be used to implement all or part of any of the methods, equations, and/or calculations described herein.

As shown in FIG. 17, computer system 1700 may include processor/central processing unit (CPU) 1702, volatile memory 1704 (e.g., RAM), non-volatile memory 1706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1720 (e.g., a touchscreen, a display, and so forth) and input and/or output (I/O) device 1708 (e.g., a mouse, a keyboard, etc.). Non-volatile memory 1706 stores, e.g., journal data 1704*a*, metadata 1704*b*, and pre-allocated memory regions 1704*c*. The non-volatile memory, 1706 can include, in some embodiments, an operating system 1714, and computer instructions 1712, and data 1716. In certain embodiment, the non-volatile memory 1706 is configured to be a memory storing instructions that are executed by a processor, such as processor/CPU 1702. In certain embodiments, the computer instructions 1717 are configured to provide several subsystems, including a routing subsystem 1717A, a control subsystem 1717*b*, a data subsystem 1717*c*, and a write cache 1717*d*. In certain embodiments, the computer instructions 1717 are executed by the processor/CPU 1702 out of volatile memory 1704 to implement and/or perform at least a portion of the systems and processes shown in FIGS. 1-16. Program code also may be applied to data entered using an input device or GUI 1717 or received from I/O device 1708.

The systems, architectures, and processes of FIGS. 1-16 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 16. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor/CPU 1702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 17, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 17 shows Program Logic 1724 embodied on a computer-readable medium 1720 as shown, and wherein the Logic is encoded in computer-executable code thereby forms a Computer Program Product 1722. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, terms such as "message" and "signal" may refer to one or more currents, one or more voltages, and/or a data signal. Within the drawings, like or related elements have like or related alpha, numeric or alphanumeric designators. Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the disclosure herein must comprise more than one of that element, nor is it intended by illustrating a single element that the any disclosure herein is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A method of making a physically unclonable function (PUF) device, the method comprising:
   (a) forming a layered structure by:
   (a-1) providing a first layer of a first optically clear medium;
   (a-2) infusing a first random distribution of first quantum dots (QDs) of a first type, disposed at a first plurality of random locations, into the first layer wherein the first type of QDs are configured to generate a first color in response to being excited by an excitation source;
   (a-3) partially curing the first layer such that at least a first portion of the first random distribution of first QDs are fixed into at least a first portion of the first plurality of random locations and such that at least a second portion of the first random distribution of first QDs are not in a fixed position;
   (a-4) applying a second layer of a second optically clear medium, over the first layer of optically clear medium, after partially curing the first layer of optically clear medium;
   (a-5) infusing a second random distribution of second quantum dots (QDs) of a second type, disposed at a second plurality of random locations, into the second layer of optically clear medium, wherein the second type of QDs are configured to generate a second color in response to being excited by the excitation source, wherein the second color is different than the first color, wherein the infusion of the second random distribution of second QDs is configured so that at least a third portion of the second random distribution of second QDs are intermingled with the second portion of the first random distribution of first QDs; and
   (a-6) curing the second layer of optically clear medium to a degree sufficient to ensure that both the first random distribution of first QDs and the second random distribution of second QDs are substantially fixed into position; and
   (b) operably coupling a detector and an excitation source to the layered structure so that the excitation source is configured to direct light to the first layer of optically clear medium and to the second layer of optically clear medium and so that the detector is configured to detect a pattern of light that arises from directing light at the first random distribution of first QDs and at the second random distribution of second QDs; and
   (c) constructing and arranging the excitation source, first layer of optically clear medium, second layer of optically clear medium, and detector so that the light and the pattern of light are externally unrevealed.

2. The method of claim 1, further comprising:
   (g) constructing and arranging the layered structure, detector and source so that the pattern of light has a first appearance if the detector is operably coupled to the first layer of optically clear medium and a second appearance if the detector is operably coupled to the second layer of optically clear medium, wherein the first and second appearance are different.

3. The method of claim 1, wherein the first random distribution of first QDs are associated with a first bandgap and the second random distribution of second QDs are associated with a second bandgap that is different than the first bandgap, wherein partially curing the first layer of optically clear medium is configured to ensure that the first layer of optically clear medium and the second layer of optically clear medium form a quasi-heterogenous layering of different bandgap QDs.

4. The method of claim 1, further comprising:
   (a-7) operably coupling the layered structure to a support structure.

5. The method of claim 1, wherein the layered structure is formed directly onto a support structure.

6. The method of claim 5, wherein the support structure comprises a three-dimensional object.

7. The method of claim 1, further comprising:
   (a-7) applying a reflector to the second layer of optically clear medium, after curing the second layer of optically clear medium.

8. The method of claim 7, wherein the reflector is configured to re-direct unabsorbed light back into the layered structure.

9. The method of claim 7, wherein the reflector is configured to provide at least one of mechanical and electrical protection for the layered structure.

10. The method of claim 7, wherein the reflector is configured to help conceal the pattern of light that arises from directing light at the first random distribution of first QDs and at the second random distribution of second QDs, to help ensure that at least one of the light and the pattern of light are externally unrevealed.

11. The method of claim 1, further comprising enclosing at least a portion of the PUF device within a tamper evident structure, wherein an arrangement of the PUF device and the tamper evident structure is configured so that an attempt to view the layered structure will cause a damage to at least one of the first random distribution of first QDs and the second random distribution of second QDs, wherein the damage changes the pattern of light.

12. The method of claim 1, further comprising:
(c) operably coupling an external control signal to the excitation source, wherein the external control signal is configured to control the light that the excitation source directs to the first layer of optically clear medium and to the second layer of optically clear medium.

13. The method of claim 1, further comprising:
(c) operably coupling a computer system to the layered structure, the computer system configured to interpret the pattern of light detected by the detector.

14. The method of claim 1, wherein step (a-6) further comprises:
(a-6-1) partially curing the second layer of optically clear medium such that at least a first portion of the second random distribution of second QDs are fixed into at least a first portion of the second plurality of random locations and such that at least a second portion of the second random distribution of second QDs are not in a fixed position;
(a-6-2) applying a third layer of a third optically clear medium, over the second layer of optically clear medium, after partially curing the second layer of optically clear medium;
(a-6-3) infusing a third random distribution of third QDs of a third type, disposed at a third plurality of random locations, into the third layer of optically clear medium, wherein the third type of QDs are configured to generate a third color in response to being excited by the excitation source, wherein the third color is different than the first color and is different than the second color, wherein the infusion of the third random distribution of third QDs is configured so that at least a fourth portion of the third random distribution of third QDs are intermingled with the second portion of the second QDs; and
(a-6-4) curing the first layer of optically clear medium, second layer of optically clear medium, and third layer of optically clear medium to a degree sufficient to ensure that the first random distribution of first QDs, second random distribution of second QDs, and third random distribution of third QDs, are substantially fixed into position;
wherein the excitation source is configured to direct light to the first layer of optically clear medium, second layer of optically clear medium and third layer of optically clear medium, and wherein the detector is configured to detect a pattern of light that arises from directing light at the first random distribution of first QDs, second random distribution of second QDs, and third random distribution of third QDs; and
wherein the excitation source, first layer of optically clear medium, second layer of optically clear medium, and third layer of optically clear medium, are constructed and arranged so that the light and the pattern of light are externally unrevealed.

15. The method of claim 14, wherein the layered structure, detector and excitation source are constructed and arranged so that the pattern of light has a first appearance if the detector is fixedly attached to the first layer of optically clear medium and a second appearance if the detector is fixedly attached to the third layer of optically clear medium, wherein the first and second appearance are different.

16. The method of claim 14, wherein the first, second, and third layers are constructed and arranged so that the first color of light associated with the first random distribution of first QDs has a shorter wavelength of light than the second color of light associated with the second random distribution of second QDs and wherein the second color of light associated with the second random distribution of second QDs has a shorter wavelength of light than the third color of light associated with the third random distribution of third QDs.

17. A method of making a physically unclonable function (PUF) structure, the method comprising:
providing a first layer of a first optically clear medium;
infusing a first random distribution of first quantum dots (QDs) of a first type, disposed at a first plurality of random locations, into the first layer of first optically clear medium, wherein the first type of QDs are configured to generate a first color in response to being excited by an excitation source;
partially curing the first layer of first optically clear medium such that at least a first portion of the first random distribution of first QDs are fixed into at least a first portion of the first plurality of random locations and such that at least a second portion of the first random distribution of first QDs are not in a fixed position;
applying a second layer of a second optically clear medium, over the first layer of first optically clear medium, after the partially curing of the first layer of first optically clear medium;
infusing a second random distribution of second quantum dots (QDs) of a second type, disposed at a second plurality of random locations, into the second layer of second optically clear medium, wherein the second type of QDs are configured to generate a second color in response to being excited by the excitation source, wherein the second color is different than the first color, wherein the infusion of the second random distribution of second QDs is configured so that at least a third portion of the second random distribution of second QDs are intermingled with the second portion of the first random distribution of first QDs; and
curing the first layer of first optically clear medium and the second layer of second optically clear medium to a degree sufficient to ensure that both the first random distribution of first QDs and the second random distribution of second QDs are substantially fixed into position and so that the first layer of first optically clear medium and the second layer of second optically clear medium, form a layered structure having a first side adjacent to the first layer of first optically clear medium and a second side adjacent to the second layer of second optically clear medium;

wherein the layered structure is configured so that, when a detector is operably coupled to the second side of the layered structure and when an excitation source is coupled to the first side of the layered structure, the excitation source is configured to direct light through the first layer of first optically clear medium and through the second layer of second optically clear medium, and the detector is configured to detect a first pattern of light that arises from directing light at the first random distribution of first QDs and the second random distribution of second QDs; and wherein the layered structure is configured so that, when the layered structure is operably coupled to the excitation source and detector, the light that is directed and the first pattern of light that arises, are externally unrevealed.

18. The method of claim 17, wherein the PUF structure is configured so that, when a detector is operably coupled to the first side of the PUF structure and when an excitation source is coupled to the second side of the PUF structure, the excitation source is configured to direct light through the second layer of second optically clear medium and through the first layer of first optically clear medium, and the detector is configured to detect a second pattern of light that arises from directing light at the second random distribution of second QDs and at the first random distribution of first QDs, wherein the second pattern of light is different than the first pattern of light.

19. A method of making a physically unclonable function (PUF) device, the method comprising:

providing an article of manufacture having at least one surface thereon;

coupling a detector to the at least one surface;

encapsulating the article of manufacture, including the detector, in a layer of optically clear medium;

infusing a random distribution of quantum dots (QDs) of a plurality of different bandgap types, disposed at a plurality of random locations, into the layer of optically clear medium, wherein the plurality of different bandgap types of the random distribution of QDs, are configured to generate a corresponding plurality of different colors in response to being excited by an excitation source;

embedding at least one detector within the optically clear medium;

curing the layer of optically clear medium to a degree sufficient to ensure that the random distribution of QDs and the detector, are substantially fixed into position; and configuring the article of manufacture so that when the excitation source is configured to direct light through the layer of optically clear medium, the detector is configured to detect a pattern of light that arises from light impinging on the random distribution of QDs; and wherein the article of manufacture, the layer of optically clear material, the random distribution of QDs, and the excitation source, are configured so that, when the excitation source directs light through the layer of optically clear material, the light that is directed and the pattern of light that arises, are externally unrevealed.

20. The method of claim 19, further comprising:

operably coupling an external system to the detector, the external system configured to interpret the pattern of light detected by the detector.

* * * * *